(12) United States Patent
Wu et al.

(10) Patent No.: US 8,574,716 B2
(45) Date of Patent: Nov. 5, 2013

(54) IONIC POLYMER DEVICES AND METHODS OF FABRICATING THE SAME

(75) Inventors: Yongxian Wu, Wayne, NJ (US);
Bun-ichiro Nakajima, Irvine, CA (US);
Shinji Takeda, Ibaraki (JP); Iwao Fukuchi, Minoo (JP); Naoki Asano, Ibaraki (JP); Anthony H. Tsai, Irvine, CA (US)

(73) Assignees: Hitachi Chemical Co., Ltd., Tokyo (JP); Hitachi Chemical Research Center, Inc., Irvine, CA (US)

( * ) Notice: Subject to any disclaimer, the term of this patent is extended or adjusted under 35 U.S.C. 154(b) by 718 days.

(21) Appl. No.: 12/613,319

(22) Filed: Nov. 5, 2009

(65) Prior Publication Data
US 2010/0141085 A1 Jun. 10, 2010

Related U.S. Application Data

(63) Continuation-in-part of application No. 12/497,610, filed on Jul. 3, 2009, now abandoned, which is a continuation-in-part of application No. 12/161,941, filed as application No. PCT/US2007/001853 on Jan. 23, 2007, now abandoned.

(60) Provisional application No. 60/761,175, filed on Jan. 23, 2006.

(51) Int. Cl.
| | |
|---|---|
| *B32B 9/04* | (2006.01) |
| *B32B 7/04* | (2006.01) |
| *B32B 5/16* | (2006.01) |
| *C08G 75/02* | (2006.01) |
| *B05D 5/12* | (2006.01) |

(52) U.S. Cl.
USPC .......... 428/411.1; 427/58; 428/419; 428/323; 428/327; 524/609

(58) Field of Classification Search
None
See application file for complete search history.

(56) References Cited

U.S. PATENT DOCUMENTS

| 4,602,426 A | 7/1986 | Kampe et al. |
| 6,054,230 A | 4/2000 | Kato |

(Continued)

FOREIGN PATENT DOCUMENTS

| JP | 2003-031232 | 1/2003 |
| JP | 2008-117750 | 5/2008 |

(Continued)

OTHER PUBLICATIONS

Qiao et al., Hydrocarbon Polymer Electrolytes for Fuel Cell Applications, p. 112 in Electroanalytical Chemistry—Research Developments, 2007. http://books.google.com/books?id=6B65mSLYa9kC&pg=PA112&lpg=PA112&dq=proton+conductivity+IEC&source=bl&ots=lhAc2OVgM5&sig=OZEN3APS4j_ZtDuO6sw0SDyfKXM&hl=en&sa=X&ei=eEbrT_y8BqLb0QGs5pjkBQ&ved=0CEIQ6AEwAg#v=one.*

(Continued)

*Primary Examiner* — Callie Shosho
*Assistant Examiner* — Coris Fung
(74) *Attorney, Agent, or Firm* — Knobbe, Martens, Olson & Bear, LLP

(57) ABSTRACT

An ionic polymer composite device and methods for fabricating the ionic polymer composite device are provided. The ionic polymer composite device includes two extended electrode layers, each extended electrode layer including at least one ionic polymer with a plurality of electrically conductive particles, and a dielectric layer including at least one sulfonated poly ether sulfone polymer or a derivative between the two extended electrode layers.

35 Claims, 12 Drawing Sheets

(56) References Cited

U.S. PATENT DOCUMENTS

| | | | |
|---|---|---|---|
| 6,475,639 | B2 | 11/2002 | Shahinpoor et al. |
| 6,641,862 | B1 | 11/2003 | Grot |
| 2002/0107140 | A1* | 8/2002 | Hampden-Smith et al. .. 502/185 |
| 2003/0228512 | A1* | 12/2003 | Vyas et al. ...................... 429/38 |
| 2004/0005474 | A1* | 1/2004 | Charnock et al. ............. 428/515 |
| 2004/0101730 | A1 | 5/2004 | Hirano et al. |
| 2004/0149965 | A1* | 8/2004 | Otsuki et al. .................. 252/500 |
| 2006/0159982 | A1* | 7/2006 | Yoshitake et al. .............. 429/44 |
| 2006/0251965 | A1* | 11/2006 | Nagayama et al. ........... 429/209 |
| 2009/0032394 | A1 | 2/2009 | Wu et al. |
| 2009/0173632 | A1 | 7/2009 | Nagayama et al. |
| 2011/0236340 | A1* | 9/2011 | Mansky et al. .............. 424/78.1 |

FOREIGN PATENT DOCUMENTS

| | | |
|---|---|---|
| JP | 2009-523905 | 6/2009 |
| WO | WO2004075321 * | 2/2004 |
| WO | WO2006/093257 A1 | 9/2006 |

OTHER PUBLICATIONS

International Search Report and the Written Opinion mailed on Apr. 11, 2008 from Application Serial No. PCT/US07/01853, filed Jan. 23, 2007.

Wang, et al. "Direct polymerization of sulfonated poly (arylene ether sulfone) random (statistical) copolymers: candidates for new proton exchange membrane," Journal of Membrane Science, 197, pp. 231-242, 2002.

Chinese Office Action dated Sep. 10, 2012 corresponding Chinese Patent No. 2010102229680.

Japanese Office Action from Co-pending Japanese Patent Application No. 2010-151964 mailed on Mar. 21, 2012.

* cited by examiner

IONIC POLYMER DEVICES AND METHODS OF FABRICATING THE SAME

CROSS REFERENCE TO RELATED APPLICATIONS

This application is a continuation in part application of U.S. application Ser. No. 12/497,610, filed Jul. 3, 2009 now abandoned, which is a continuation in part application of U.S. application Ser. No. 12/161,941, filed Jul. 23, 2008 now abandoned, which is the National Phase application under 35 U.S.C. §371 of International Application No. PCT/US2007/001853 (published as WO 07/084,796), filed Jan. 23, 2007, which claims further benefit under 35 U.S.C. §119(e) of U.S. Provisional Application No. 60/761,175, filed Jan. 23, 2006. The disclosures of the prior applications are hereby incorporated by reference.

BACKGROUND OF THE INVENTION

1. Field of the Invention

The present invention relates to novel ionic polymer device structures and novel methods of fabricating ionic polymer devices that can be configured as actuators, sensors, and transducers.

2. Description of the Related Art

Ionic polymer or ionomer composite material is one of the emerging classes of electroactive polymers and functional smart materials that can be made into soft bending actuators and sensors. The material was originally manufactured for fuel cell applications and its unique biomimetic sensing-actuating properties were not found until 1992. A typical ionic polymer actuator/sensor element comprises a thin polyelectrolyte ion-exchange polymer membrane in the middle as a dielectric layer and plated metal layers on two opposite surfaces of the ionomer membrane as electrodes. The ion-exchange polymer typically has a hydrophobic backbone and negatively charged hydrophilic functional groups (anion) as side chains. These side chains are associated with positively charged mobile cations. When the ion-exchange polymer absorbs a solvent, the interconnected solvent-containing cluster network is formed within the polymer matrix. While the anion are fixed to the polymer backbone (polymer matrix), the cations are free to move from cluster to cluster within the solvent upon electric stimulation. Conventional ionic polymer composite uses perfluorinated ion-exchange polymers as base polymers, such as a perfluoro-sulfonic polymer (Nafion®) and perfluoro-carboxylic polymer (Flemion®). These materials are soft and have a small mechanical stiffness.

When a potential is applied to the ionic polymer actuator, the unbound cations can move in and out of the clusters through the solvent and redistribute within the ionic polymer itself to form anode and cathode boundary layers. The change in electrostatic force and osmotic pressure, balanced by the elastic resistance, drives solvent into or out of the boundary layer clusters, and causes change in the volumes of interconnected clusters at this boundary-layer. This change in volume leads to the deformation or bending of the actuator. The charge distribution and the change in water uptake may be calculated by a coupled chemo-electro-mechanical formulation.

Ionic polymer materials offer significant advantages over conventional electromechanical materials and systems due to their compact sizes, light weight and the ability to be cut into any shape from the fabricated material. The fabricated device requires only modest operating voltage. The ionic polymer actuator can respond to small electric stimulus by generating large bending deformation, while the ionic polymer sensor responds to mechanical deformation (or vibration) by generating electrical signals. The sudden bent of the ionic polymer produces a small voltage (in the range of mV). In addition, the actuating/sensing function can be tailored by changing the micro-structure, the electrical input, the cation composition, and the solvent type and amount. The material is biocompatible and can be operated in various kinds of solvents. It may be developed to provide new, self-integrated material systems for biomedical and robotic applications.

One of many factors that can affect the coupled chemo-electro-mechanical responses of an ionic polymer based sensor/actuator is the electrode morphology and effective electrical capacitance. Traditional fabrication method for forming electrodes on an ionic polymer device involves first roughening and cleaning the surface of an already cured polymer membrane, allowing a substance capable of undergoing chemical reduction to be absorbed from the polymer surfaces, and reducing the absorbed substance to form electrodes. It normally requires repeated absorbing and reduction steps to allow more substance to diffuse into the ionic polymer membrane, and therefore a lengthy and expensive process. However, the diffusion of substance into a polymer membrane is still limited to less than about 20 microns from the membrane surface. Not only is the fabrication process expensive, the performance of the ionic polymer actuator/sensor is also affected by the diffusion limitation of the conductive material.

SUMMARY OF THE INVENTION

An object of this invention is to provide novel ionic polymer device or ionic polymer actuator/sensor and the fabrication techniques that allow for simpler, cheaper and faster manufacturing processes. The fabrication methods increase electrical capacitance of the ionic polymer device by creating a large interfacial area between the polymer phase and the electrically conductive phase or electrodes, thereby improving its actuation performance and sensitivity.

The methods and devices of the invention each have several aspects, and no single one of which is solely responsible for its desirable attributes. Without limiting the scope of this invention, its more prominent features will be discussed briefly.

Some embodiments provide an ionic polymer composite device comprising two extended electrode layers, each extended electrode layer comprising a first ionic polymer and a plurality of electrically conductive particles, and a dielectric layer comprising a second ionic polymer between the two extended electrode layers, wherein the second ionic polymer is a second sulfonated poly ether sulfone polymer or a derivative thereof.

Some embodiments provide an ionic polymer composite device comprising two extended electrode layers, each extended electrode layer comprises a plurality of domains comprising a first ionic polymer with a high swelling ratio, and a matrix phase comprising a polymer having a substantially continuous three dimensional network structure, wherein the plurality of domains is embedded in the matrix phase, and a dielectric layer comprising a second ionic polymer between the two extended electrode layers, wherein the second ionic polymer is a second sulfonated poly ether sulfone polymer or a derivative thereof.

In some embodiments, the sulfonated poly ether sulfone polymer is represented by one of the following formulas:

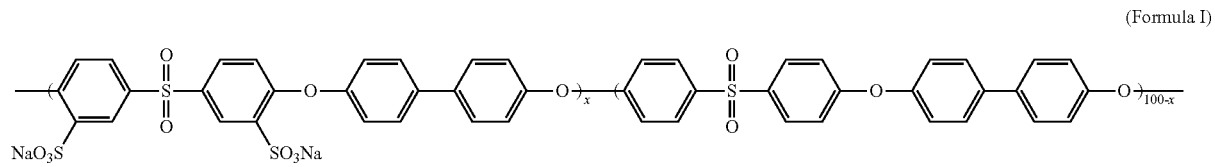
(Formula I)

wherein x is from about 30 to about 70;

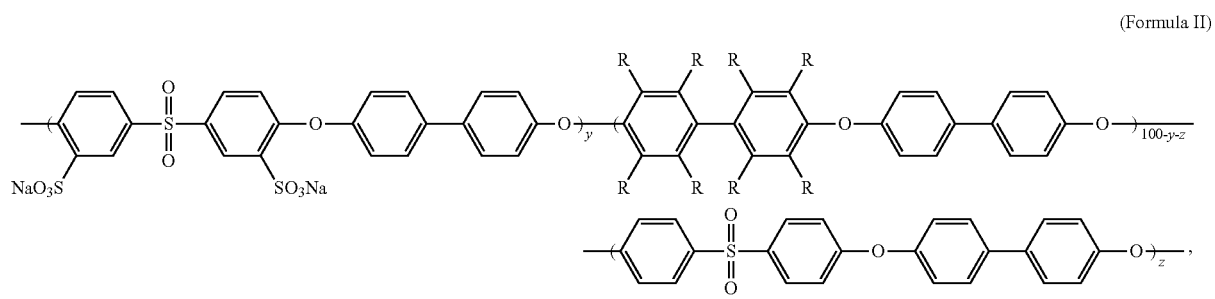
(Formula II)

wherein R is H or F, each of y and z is from about 30 to about 70; and

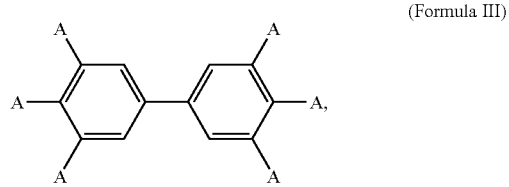
(Formula III)

wherein A is independently

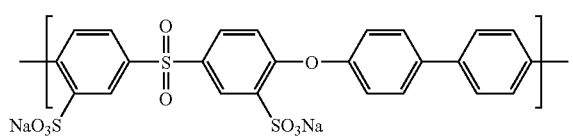

or OH, and at least one A is

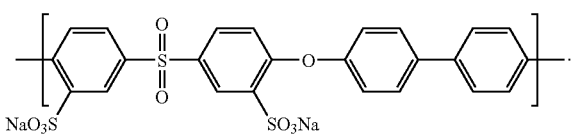

Some embodiments provide a method of making an ionic polymer composite device comprising providing at least one mixture comprising the plurality of conductive particles dispersed in a first ionic polymer solution comprising a first sulfonated poly ether sulfone polymer or a derivative thereof, forming two ionic polymer layers by curing the at least one mixture, wherein the plurality of conductive particles are distributed within each of the two ionic polymer layers, and positioning a dielectric layer between the two ionic polymer layers to form the ionic polymer composite device, wherein the dielectric layer comprises a second sulfonated poly ether sulfone polymer or a derivative thereof.

Some embodiments provide a method of making an ionic polymer composite device comprising providing a liquid mixture comprising the ionic polymer, the matrix phase polymer, and a plurality of conductive particles dissolved in a solvent, forming two extended electrode layers by coating the liquid mixture on a substrate and drying, providing an dielectric layer comprising a sulfonated poly ether sulfone polymer, and combining the dielectric layer between two extended electrode layers to form the ionic polymer composite device.

BRIEF DESCRIPTION OF THE DRAWINGS

These and other aspects of the invention will be readily apparent from the following description and from the appended drawings (not to scale), which are meant to illustrate and not to limit the invention, and wherein.

DETAILED DESCRIPTION OF THE EMBODIMENTS

Figure 1:
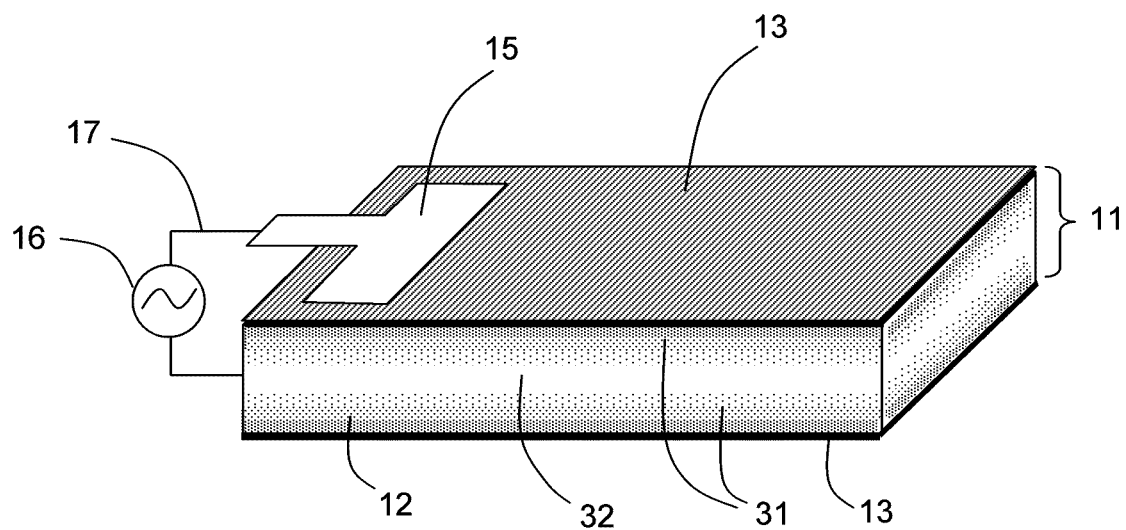
FIG. 1 illustrates one embodiment of an actuator/sensor device according to the present invention.

The following detailed description is directed to certain specific embodiments of the invention. However, the invention can be embodied in a multitude of different ways. In this description, reference is made to the drawing wherein like parts are designated with like numerals throughout.

Embodiments of this invention provide a novel polymer and electrode materials for fabricating ionic polymer devices. Some embodiments can also be configured as a sensor or an actuator. Actuator converts electric stimulation into geometrical deformation and force output and sensor converts the geometrical deformation and force input into electrical signal. The actuation and sensing performances have been improved. Using these relatively less expensive material components also serve to reduce the cost of manufacturing the devices.

Embodiments of methods of present invention are designed to increase the interfacial area between the polymeric phase and the conductive phase for optimizing the performance and sensitivity of various ionic polymer devices. The enhanced electrode morphology allows the ionic polymer devices made by this method to exhibit a large effective electrical capacitance, and therefore achieve an increased actuation and/or sensing capability. The methods of this invention also enable efficient fabrication of functional polymer composites. The process involves fewer steps and allows for a greater control over the structure of the ionic polymer composite. The process is simple, less expensive and more efficient. Certain embodiments of the methods are suitable to be adopted for manufacturing ionic polymer devices in a variety of dimensions such as micro- to centimeter-scale thicknesses, and different configurations such as single devices, sensor/actuator arrays, systems or complex devices.

FIG. 1 depicts certain embodiments of the ionic polymer device comprising a polymer composite 11 and at least one conductive layer 13 as surface electrodes on two opposite surfaces of the polymer composite 11. The polymer composite 11 is made of at least one ionic polymer. Ionic polymer, also known as ion-exchange polymer or ionomer, may be either cation exchange polymers or anion exchange polymers. In some embodiments, the thickness of the polymer composite 11 may be a few microns to centimeters depending on the application. In preferred embodiments, the thickness of the entire polymer composite may be from about 1 µm to about 10 cm, preferably about 10 µm to about 1 cm, and more preferably about 100 µm to about 1 mm.

The ionic polymer composite comprises two extended electrode layers 31 and an ionic polymer dielectric layer 32 sandwiched between two extended electrode layers 31. Each of the two extended electrode layers 31 comprises at least one ionic polymer with a plurality of conductive particles 12. In some embodiments, the plurality of conductive particles 12 forms a concentration gradient in each of the two extended electrode layers 31. In some embodiments, the plurality of conductive particles 12 is well-dispersed within the extended electrode layer 31. The plurality of conductive particles is considered well-dispersed when the particles are not aggregated, and in some embodiments, the particles may be close to mono-dispersed. Generally, the conductive particles 12 may be any nano- or micro-scale particles that are electrically conductive. Non-limiting examples of conductive particles 12 are metal particles such as Pt, Au, Ag, Ni, Cu, and Pd, and non-metal particles such as conducting polymers, carbon nanotubes, and graphite. The metal particles may be of any shape, and may be preformed, formed by metallic-salt reduction in the polymer or commercially available. The thickness of each extended electrode layer 31 may be about 1% to about 49%, preferably about 10% to about 40% and more preferably about 15% to about 30% of the entire polymer composite thickness in a dry state.

In some embodiments, the dielectric layer 32 comprises at least one sulfonated poly ether sulfone (SPES) polymer or a derivative thereof. In some embodiments, the extended electrode layers 31 may also comprise at least one SPES polymer or a derivative thereof. The SPES polymer or a derivative thereof is an aromatic sulfonated ion-exchange copolymer. Compared with conventional ionic polymers, the SPES polymer provides a polymer solution with a high viscosity, and thus makes it easier for dispersion of conductive particles in the extended electrode layers. The SPES polymer also has an enhanced thermal stability and is resistant to oxidation and acid catalyzed hydrolysis. As a result, it has enhanced actuator reliability and the application of a larger driving voltage becomes possible.

The SPES polymer exhibits a high ion exchange capacity (IEC), such as between about 0.9 meq/g and about 3.3 meq/g. The IEC is a parameter that indicates the cation conductivity of an ion-exchange polymer. It measures the amount of functional groups (or mobile cations) within a fixed amount of ion-exchange polymer, in the unit of meq/g (milli equivalent mole of functional group per gram of polymer). In some embodiments, the increased IEC of a SPES polymer provides increased cation conductivity. Range of the IEC can be from about 0.1 to about 10 meq/g, such as from about 0.9 to about 4 meq/g. In some embodiments, the IEC of a SPES polymer is also tailorable. For example, the IEC of the SPES polymer can be tailored to be from about 1.4 to about 3.3 meq/g and be referred to as having high IEC. In another example, the IEC can be tailored to be from about 1.8 to about 3.3 meq/g and be referred to as having a higher IEC or having a preferred range for certain applications such as central neat polymer layer in anisotropic swelling structure.

In addition, the SPES polymer also has a better mechanical property, such as higher stiffness compared to the conventional Nafion® and Flemion® polymers, and thus can provide a larger force output. Since SPES polymers are made from a readily available and inexpensive monomer, it can reduce the cost of the ionic polymer composite device.

In some embodiments, the SPES polymer may be represented by one of the following formulas:

or OH, and at least one A is

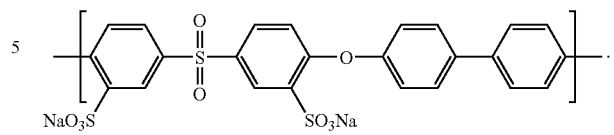

In some embodiments, more than one type of monomers are used to form the polymer of Formulas I, II and III, thus they are copolymers. The monomers or repeating units in each of these copolymers may be distributed randomly, in alternating order or in blocks. The x, y and z in the formulas represent the % of each of the monomers used to form the polymer. For example in Formula I, when x is about 30, it means that about 30% of (Formula I)

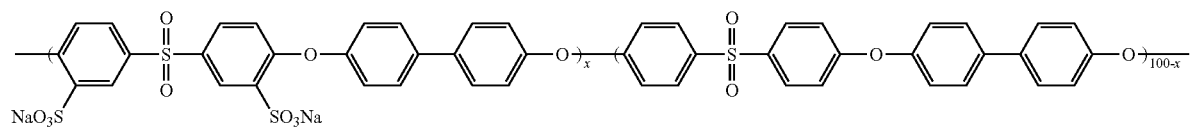

wherein x is from about 30 to about 70;

(Formula II)

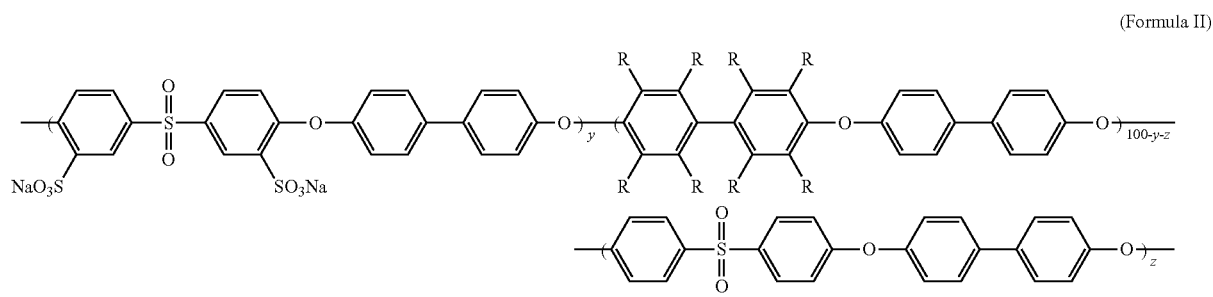

wherein R is H or F, each of y and z is from about 30 to about 70; and (Formula III)

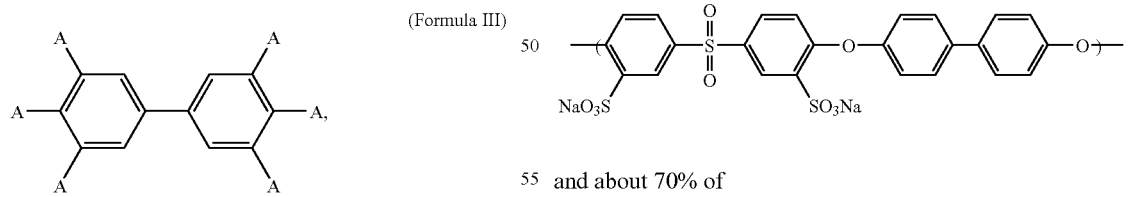

wherein A is independently

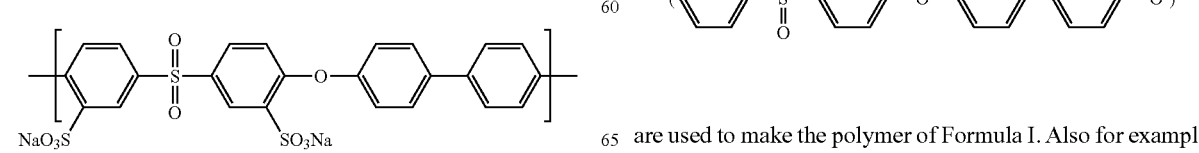

and about 70% of are used to make the polymer of Formula I. Also for example in Formula II, when y is about 40 and z is about 50, it means that about 40% of

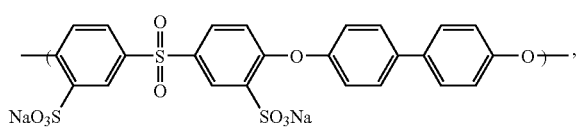

about 10% of

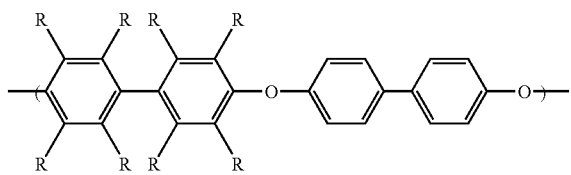

and about 50% of

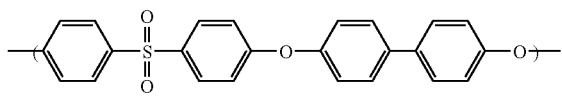

are used to make the polymer of Formula II.

In some embodiments, a high molecular-weight SPES may be used for both the extended electrode layers 31 and the dielectric layer 32. For example, the high molecular-weight SPES can have weight-average molecular-weight of more than about 100,000. There is no particular upper limit on the molecule other than physical/chemical restraints. Examples of the high molecular-weight SPES include Formula I and II as shown above.

The SPES polymer of Formula I can be made according to a method disclosed in "Direct polymerization of sulfonated poly (arylene ether sulfone) random (statistical) copolymers: candidates for new proton exchange membrane," Journal of Membrane Science, 197, pp 231-242, 2002, the disclosure of which is hereby incorporated by reference. The SPES polymer of Formula I can be made from examples of chemical reactions as described below. From the disclosed examples, an ordinary skilled artisan can easily obtain different variations of the SPES polymers by modifying quantity of reactants, reaction temperatures, and reaction time.

Synthesis Example 1a

Synthesis of Formula I (SPES-Ia)

4,4'-Dichlorodiphenylsulfone-3,3'-disulfonic acid sodium salt monohydrate (30.56 g, 0.060 mol), 4,4'-dichlorodiphenylsulfone (34.46 g, 0.120 mol), 4,4'-dihydroxybiphenyl (37.24 g, 0.200 mol), potassium carbonate (33.17 g, 0.240 mol), N-methylpyrrolidone (220 mL) and toluene (170 mL) were added to a four-neck round-bottom flask (1000 mL) equipped with a Dien-Stark trap, a condenser, a stirrer, and a nitrogen feed tube. The mixture was heated to about 160° C. and refluxed for 2 hours, and the temperature was then raised to 190° C. and stirring was conducted for 39 hours to distill off the toluene. After cooling down to 110° C., 4,4'-difluorobiphenylsulfone (5.09 g, 0.020 mol) and N-methylpyrrolidone (230 mL) were added and stirred for 1 hour, and then for 12 hours at 180° C. Upon cooling, the solution was poured into 2500 mL of water and a compound was precipitated. The precipitated compound was filtered and thoroughly washed with distilled water. Objective high molecular weight SPES was obtained by subsequent heat drying for 5 hours at 140° C.

The reaction yielded about 91.0 g of SPES-Ia with recovery rate of about 98.5%. The weight-average molecular weight of SPES-Ia was about 212,470 with dispersivity of about 4.21 and ion exchange capacity of about 1.35 meq/g. The SPES-Ia represents polymer of formula I, wherein x is 30.

Synthesis Example 1b

Synthesis of Formula I (SPES-Ib)

4,4'-Dichlorodiphenylsulfone-3,3'-disulfonic acid sodium salt monohydrate (76.4 g, 0.150 mol), 4,4'-dichlorodiphenylsulfone (21.54 g, 0.750 mol), 4,4'-dihydroxybiphenyl (46.55 g, 0.250 mol), potassium carbonate (41.46 g, 0.300 mol), N-methylpyrrolidone (230 mL) and toluene (270 mL) were added to a four-neck round-bottom flask (1000 mL) equipped with a Dien-Stark trap, a condenser, a stirrer and a nitrogen feed tube. The mixture was heated to about 160° C. and refluxed for about 2 hours to distill off the toluene, and the temperature was then raised to 190° C. and stirring was conducted for 18 hours. After cooling down to 110° C., 4,4'-difluorobiphenylsulfone (6.36 g, 0.025 mol) and N-methylpyrrolidone (230 mL) were added and stirred for 1 hour, and then for 25 hours at 180° C. Upon cooling, the solution was poured into 2500 mL of water and a compound was precipitated. The precipitate was filtered and thoroughly washed with distilled water. Objective high molecular weight SPES-Ib was obtained by subsequent heat drying for 5 hours at 140° C.

The reaction yielded about 124.5 g of SPES-Ib with a recovery rate of about 95.2%. The weight-average molecular weight was 192,609 with dispersivity of 2.60 and the ion exchange capacity of 2.13 meq/g. The SPES-Ib represents polymer of formula I, wherein x is 60.

The SPES polymer of Formula II can be made from similar procedures as described above in regard to SPES polymer of Formula I. The SPES polymer of Formula II can be made from examples of chemical reactions as described below. From the disclosed examples, an ordinary skilled artisan can easily obtain different variations of the SPES polymers by modifying quantity of reactants, reaction temperatures, and reaction time.

Synthesis Example 2a

Synthesis of Formula II where R is F (SPES-IIa)

4,4'-Dichlorodiphenylsulfone-3,3'-disulfonic acid sodium salt monohydrate (30.56 g, 0.060 mol), 4,4'-dichlorodiphenylsulfone (34.46 g, 0.120 mol), 4,4'-dihydroxybiphenyl (37.24 g, 0.200 mol), potassium carbonate (33.17 g, 0.240 mol), N-methylpyrrolidone (220 mL), and toluene (170 mL) were added to a four-neck round-bottom flask (500 mL) equipped with a Dien-Stark trap, a condenser, a stirrer and a nitrogen feed tube. The mixture was heated to 160° C. and refluxed for 2 hours, and the temperature was then raised to 190° C. and stirring was conducted for 16 hours to distill off the toluene. After cooling down to 110° C., decafluorobiphenyl (6.68 g, 0.020 mol) and N-methylpyrrolidone (170 mL) were added and stirred for 1 hour, and then for 9 hours at 140° C. Upon cooling, the solution was poured into 7000 mL of water and a compound was precipitated. The precipitated compound was filtered and thoroughly washed with distilled water. Objective high molecular weight SPES was obtained by subsequent heat drying for 6 hours at 140° C.

The reaction yielded about 101.1 g of SPES-IIa with recovery rate of about 107.6%. The weight-average molecular weight of the SPES-IIa was about 225,940 with dispersivity of about 4.28 and ion exchange capacity of about 1.27 meq/g. The SPES-IIa represents polymer of formula II, wherein y is 30, z is 60 and R is F.

Synthesis Example 2b

Synthesis of Formula II where R is F (SPES-IIb)

4,4'-Dichlorodiphenylsulfone-3,3'-disulfonic acid sodium salt monohydrate (48.38 g, 0.095 mol), 4,4'-dichlorodiphenylsulfone (21.83 g, 0.760 mol), 4,4'-dihydroxybiphenyl (35.38 g, 0.190 mol), potassium carbonate (31.51 g, 0.228 mol), N-methylpyrrolidone (220 mL) and toluene (170 mL) were added to a four-neck round-bottom flask (1000 mL) equipped with a Dien-Stark trap, a condenser, a stirrer and a nitrogen feed tube. The mixture was heated to 160° C. and refluxing for 2 hours to distill off the toluene, and the temperature was then raised to 190° C. and stirring was conducted for 36 hours. After cooling down to 110° C., decafluorobiphenyl (6.35 g, 0.019 mol) and N-methylpyrrolidone (170 mL) were added and stirred for 1 hour, and then for 9 hours at 180° C. Upon cooling, the solution was poured into 2500 mL of water and a compound was precipitated. The precipitate was filtered and thoroughly washed with distilled water. Objective high molecular weight SPES was obtained by subsequent heat drying for 5 hours at 140° C.

The reaction yielded about 131.0 g of SPES-IIb with recovery rate of 135.1%. The weight-average molecular weigh was about 634,600 with a dispersivity of 8.97 and an ion exchange capacity of 2.06 meq/g. The SPES-IIb represents polymer of formula II, wherein y is 50, z is 40 and R is F.

Synthesis Example 2c

Synthesis of Formula II where R is F (SPES-IIc)

4,4'-Dichlorodiphenylsulfone-3,3'-disulfonic acid sodium salt monohydrate (67.90 g, 0.1333 mol), 4,4'-dichlorodiphenylsulfone (47.86 g, 0.1667 mol), 4,4'-dihydroxybiphenyl (62.06 g, 0.3333 mol), potassium carbonate (55.27 g, 0.4000 mol), N-methylpyrrolidone (380 mL) and toluene (300 mL) were added to a four-neck round-bottom flask (500 mL) equipped with a Dien-Stark trap, a condenser, a stirrer, and a nitrogen feed tube. The mixture was heated to 160° C. and refluxed for 2 hours, and the temperature was then raised to 190° C. and stirring was conducted for 38 hours to distill off the toluene. After cooling down to 110° C., decafluorobiphenyl (11.14 g, 0.0333 mol) and N-methylpyrrolidone (300 mL) were added and stirred for 1 hour, and then for 8 hours at 140° C. Upon cooling, the solution was poured into 7000 mL of water and a compound is precipitated. The precipitated compound was filtered and thoroughly washed with distilled water. Objective high molecular weight SPES was obtained by subsequent heat drying for 6 hours at 140° C.

The reaction yielded about 180.9 g of SPES-IIc with recovery rate of about 110.3%. The weight-average molecular weight of the SPES-IIc was about 424,100 with dispersivity of about 6.44 and ion exchange capacity of about 1.44 meq/g. The SPES-IIc represents polymer of formula II, wherein y is 40, z is 50 and R is F.

In some embodiments, at least one ionic polymer in the ionic polymer composite device is a cross-linking polymer.

The cross-linking polymer may be used for either the extended electrode layers or the dielectric layer. One example of the cross-linking polymer is a SPES polymer of Formula III. The SPES polymer of Formula III can be made according to JP2008-117750, the disclosure of which is hereby incorporated by reference.

Figure 3A:
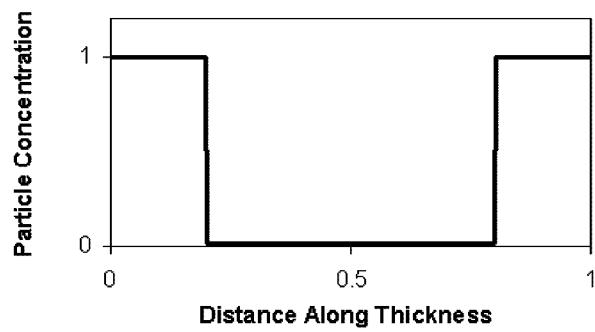
FIGS. 3A to 3D show different cross-sectional particle concentration profiles along the polymer composite thickness of embodiments of the device in FIG. 1.

The conductive particles 12 may be well-dispersed within an extended electrode layer 31, or may form a concentration gradient due to gravitational force. The concentration profiles of conductive particles 12 in certain embodiments are displayed in FIGS. 3A-3D. In some embodiments, the extended electrode layer 31 may comprise at least one polymer-particle layer 19 or multiple polymer-particle layers (see FIGS. 7 and 8A-8C). The polymer-particle layer 19 comprises a plurality of conductive particles 12 in an ionic polymer matrix. In some embodiments, all polymer-particle layers 19 that make up each of the two extended electrode layers 31 may comprise the same concentration of well-dispersed conductive particles 12. The concentration profile along the thickness of such polymer composite would show a constant concentration within a certain depth from each electrode as depicted in FIG. 3A.

Figure 3B:
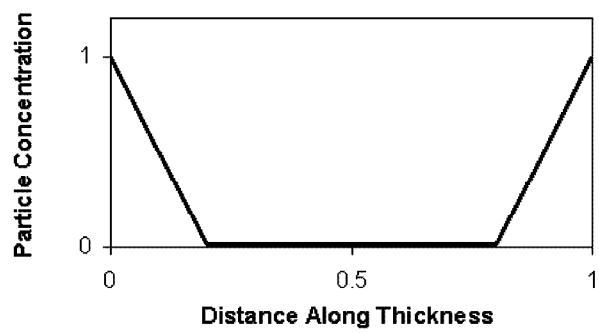
Figure 3C:
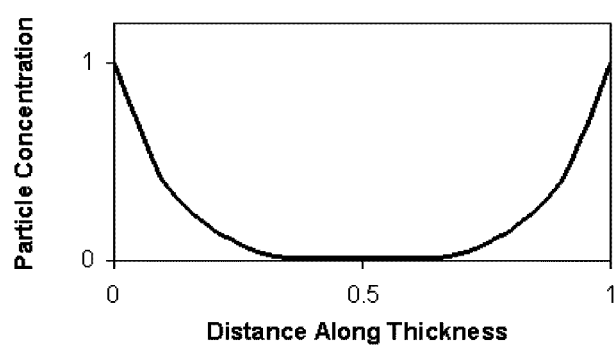

In some embodiments, the plurality of conductive particles 12 forms a concentration gradient in each of the two extended electrode layers 31, with a higher concentration at the outer surface of the extended electrode layers 31. In one embodiment, the concentration gradient may decrease linearly from the two opposite surfaces (18a and 18b) of the polymer composite 11 along the thickness of each extended electrode layer 31 (FIG. 3B). In another embodiment, the concentration gradient may decrease non-linearly from the two opposite surfaces (18a and 18b) of the polymer composite 11 along the thickness of extended electrode layers 31 (FIG. 3C). In embodiments with multiple polymer-particle layers 19, each polymer-particle layer 19 may have different concentration of conductive particles 12. In one embodiment, the inner most polymer-particle layer has a lowest concentration of conductive particles 12, and the concentration gradually increases in each polymer-particle layer 19 toward the outer most polymer-particle layer 19a. This may also result in a polymer composite with a concentration profile in FIG. 3B or 3C.

Figure 3D:
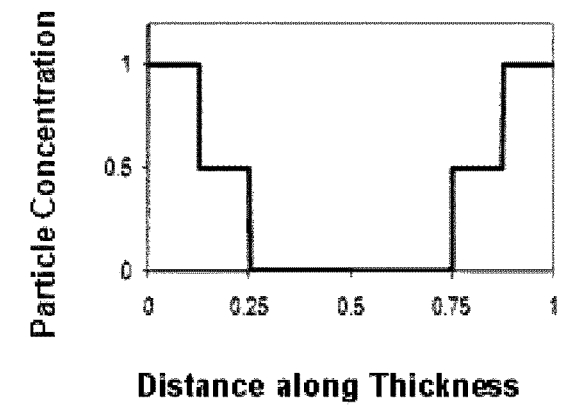
Figure 4A:
FIGS. 4A to 4D show different constructions of surface electrode layers.
Figure 4B:
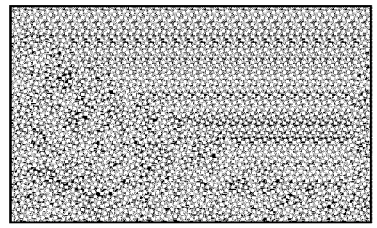
Figure 4C:
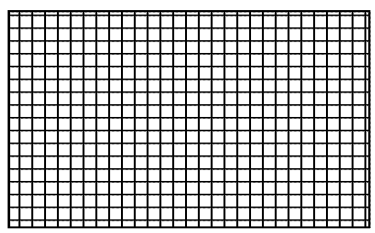
Figure 4D:
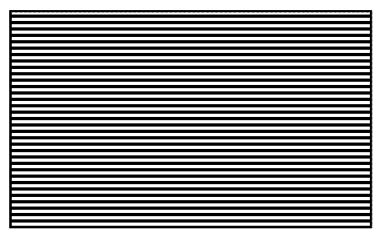

In other embodiments, each polymer-particle layer 19 that makes up an extended electrode layer 31 may comprise well-dispersed conductive particles 12, which results in substantially constant concentration along the thickness of the polymer-particle layer. By putting two or more polymer-particles layers with different particle concentrations (such as 19a and 19b in FIG. 8B) together to form an extended electrode layer 31, the conductive particle concentration profile would be as shown in FIG. 3D.

In some embodiments, electrically conductive nanoparticles with large surface area may be dispersed into polymer to form an extended electrode layer 31 between the conductive layer 13 and the dielectric layer 32. In some embodiments, nanoparticles may also include any form of nanomaterials, such as materials with nano scale in at least one dimension. For examples, nanowires, nanotubes, nanoflakes, nano porous structure, etc.

Useful conductive particles for the extended electrode layers 31 include noble metals such as gold, platinum, silver, iridium, rhenium, palladium, rhodium, ruthenium, and copper, etc. Other metals such as aluminum, iron, nickel, zinc, and lead, etc. may also be used. In some embodiments, the compounds or alloys of above metals can also be used. In some embodiments, non-metal materials can also be used as conductive particles for making extended electrode layers. Examples include, but not limited to, carbon, silicon, germanium, III-V semiconductors, II-VI semiconductors, and their compounds and alloys. In other embodiments, organic conductors such as conducting polymers may also be useful.

Although gold and platinum have been used to form the extended electrode layers, their high prices result in high costs of making actuator-sensor devices. In some embodiments, silver nanoparticles (SNP) or carbon nanoparticles (CNP) may be used as conductive particles for extended electrode layers 31 to lower the material costs.

The dielectric ionic polymer layer 32 is a layer of ionic polymer membrane that is substantially free of conductive particles 12. Examples of ionic polymer useful for making dielectric ionic polymer layer include, but are not limited to: SPES polymer, perfluoro-sulfonic polymer, perfluoro-carboxylic polymer, polystyrene-sulfonic polymer and perfluoro-tertiary ammonium polymer. The ionic polymer for the ionic polymer dielectric layer 32 may or may not be the same as the ionic polymer for the extended electrode layers 31 within the same device. The typical thickness of the dielectric ionic polymer layer 32 may be about 2% to about 98%, preferably about 20% to about 80% and more preferably about 40% to about 70% of the entire polymer composite thickness in the dry state.

Figure 2:
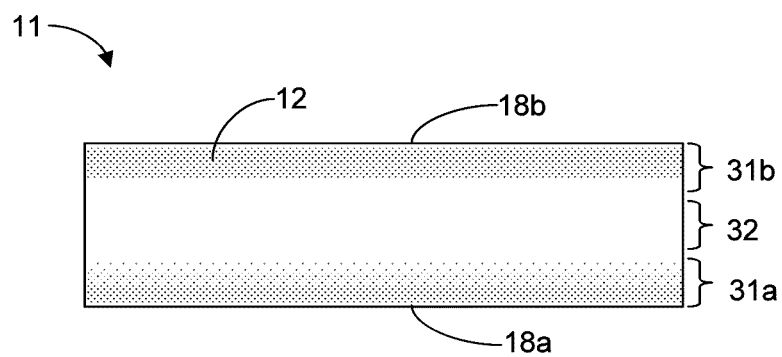
FIG. 2 is a cross-sectional view of one embodiment of a polymer composite of an ionic polymer device of FIG. 1.

In some embodiments, at least one conductive layer 13 can be deposited on the two opposite surfaces of polymer composite 11. The two opposite surfaces, the first surface 18a and the second surface 18b, of polymer composite 11 are also the outer surfaces of the extended electrode layers 31a and 31b (see FIG. 2). The conductive layers 13 are in contact with the two extended electrode layers 31, and serve as surface electrodes in an ionic polymer composite device. The conductive layer 13 may comprise a metal such as Au, Pt, Pd, Ir, Ru, Rh Ag, Al, Ni and Cu. The conductive layer 13 may further comprise non-metal such as conductive polymers, carbon nanotubes and graphite or other conductive materials. In some embodiments, the conductive layers 13 can be connected to a power supply 16 through terminals 15 and wires 17 to be configured as an actuator or a sensor element. The conductive layers 13 serves to ensure good electrical conductance (from terminals 15) throughout the surface planes, while the conductive particles 12 ensure the electrical conductance (from the conductive layers 13) along the thickness of the extended electrode layer 31.

In some embodiments, the conductive layer 13 may be deposited onto the polymer composite by any physical or chemical deposition technique. Examples include, but not limited to, electroplating, electroless plating, chemical vapor deposition, lamination, sputter coating, thermal evaporation, inkjet printing, applying (including dipping, brushing, and spraying, etc.) conductive paint, or through bonding a metal foil or mesh on the surfaces 18a and 18b of the composite. The thickness of such layer may be about 10 nm to about 500 µm, preferably about 100 nm to about 50 µm, or more preferably about 1 µm to about 5 µm. The resulting surface electrode may be a continuous sheet, porous or mesh thin films, or parallel wires (FIGS. 4A-D).

Anti-Swelling Polymer Composite Structure

A SPES ionic polymer with a large IEC normally has a large swelling ratio upon solvent uptake, such as swelling ratio from about 40% to about 200% or from about 60% to about 150%. The swelling ratio depends on polymer type and its IEC, solvent type, associated cation type, and polymer heat treatment history. For example, a dry (e.g., after placing in a vacuum oven at 100° C. over night) high-molecular weight SPES with IEC of 2.03 shows nearly 80% volume increase after soaking in deionized (DI) water at room temperature after a week. Although the large IEC and high solvent content improves cation conductivity, the large volume increase may have some negative effects to actuator-sensor performance.

Figure 5:
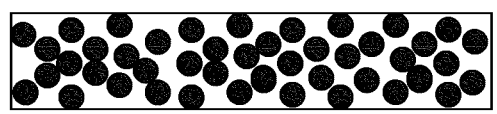
FIG. 5 shows the swelling effect of a large ion exchange capacity (IEC) ionic polymer at the extended electrode layer.
Figure 5:
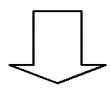
Figure 5:
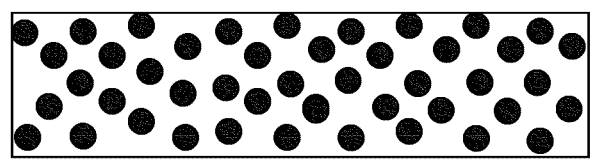

As shown in FIG. 5, when electric conductive particles are dispersed in an ionic polymer solution and the mixture further goes through the curing process, these conductive particles are closely packed in a dry polymer membrane. Upon hydration, the swelling of the polymer composite membrane will cause separation of nanoparticles and reduction of effective interfacial area, and thus decreases the equivalent electric capacitance. The operation of actuator-sensor device requires these electric conductive nanoparticles in the extended electrode layers to be closely packed, i.e., in contact or at a very small distance (a few nanometers or less). On the other hand, when the surface electrode layers are applied when the composite membrane is dry, upon hydration, the high-IEC ionic polymer at the extended electrode layer will swell at a great amount, while the surface electrode layer does not change. This expansion mismatch will generate a force between two adjacent layers. As a result, the applied surface electrode will be cracked or peeled off, and thus greatly reduce the surface conductivity.

In some embodiments, to prevent from the excessive volume change of ionic polymer in the extended electrode layers (from production to operation) and maximize the overall cation conductivity, an anisotropic swelling structure may be adopted. A lower-IEC ionic polymer may be used in the extended electrode layers 31 to provide a low expansion ratio, and a higher-IEC ionic polymer can be used in the dielectric layer 32 to ensure high cation conductivity. The overall structure is subjected to a lateral repression force imposed by the extended electrode layers having lower expansion ratio, and thus has relatively less dimensional increase in the direction of the membrane plane, while more dimension increase is observed in the direction of membrane thickness. As a result, the conductive particle separation is minimized and the conductive layers (e.g., surface electrodes) are less likely to crack or peel off.

Figure 6:
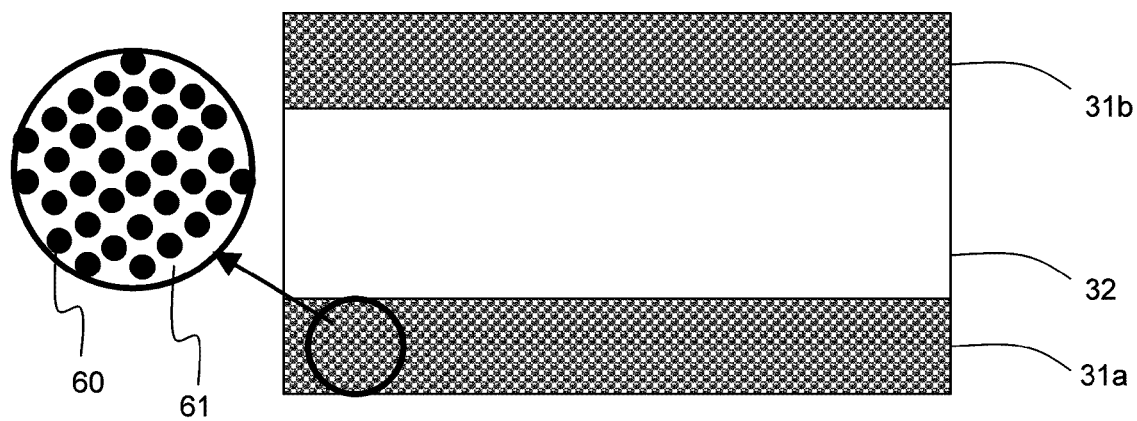
FIG. 6 shows a cross-sectional view of a phase separation polymer structure.

In some embodiments, a phase separation structure as depicted in FIG. 6 may be adopted to lower overall swelling ratio. In FIG. 6, the phase separation structure is used in the extended electrode layers 31a and 31b. The phase separation structure may comprise a domain phase 60 comprising an ionic polymer with a high swelling ratio, such as swelling ratio from about 40% to about 200%, and a matrix phase 61 comprising a polymer that can restrict the swelling of the ionic polymer in the domain phase. In some embodiments, the matrix phase polymer may be a non-ionic polymer that has low swelling ratio, such as from about 1% to about 40%, or substantially zero swelling ratio meaning that swelling ratio of less than 1% occurs. The domain phase polymer may be an ionic polymer with a large swelling ratio. In some embodiments, the polymer in the domain phase 60 may have a substantially continuous three-dimensional structure which enables ion conduction among the domains. In some embodiment, the matrix phase 61 may confine the swelling of the domain phase 60. In some embodiments, the matrix phase polymer structure may be used in either the dielectric layer 32 or the extended electrode layer 31. In some embodiment, the phase separation structure can be used in the extended electrode layer 31 with conductive particles 12 mixed in. In some embodiments, the domain phase 60 may comprise at least one SPES polymer. The SPES polymer may be selected from Formulas I, II or III as described above.

Ionic Polymer Composite Fabrication

Several methods are described for making a variety of embodiments of the ionic polymer device shown in FIG. 1. Some embodiments provide a method of forming the polymer composite by using "preformed conductive particle dispersion" to create extended electrode layers. Other embodiments provide a method for forming the polymer composite by "in-situ reduction," wherein the metallic salt is reduced in the curing polymer composite to form nano- and/or micro-scale conductive metal particles in extended electrode layers. In some embodiments, the polymer composite is made first, and the conductive layers are then deposited on two opposite surfaces of the polymer composite to form the electrodes. Other steps such as cation exchange and solvent absorption for the polymer composite may be performed before or after the forming of electrodes.

Preformed Conductive Particle Dispersion

Several embodiments provide a method for making an ionic polymer composite of an ionic polymer device using preformed conductive particles. Non-limiting examples of preformed conductive particles may be preformed or commercially available metal particles, conductive fibers or cluster chains, graphite, carbon nanotubes, conducting polymers, and any combination thereof. Preformed metal particles may be self-synthesized or commercial nanoparticles or powders. Non-limiting examples of preformed metal particles include gold nanoparticles in alcohol with particle size less than about 100 nm, preferably less than about 30 nm, or more preferably less than about 20 nm, and silver nanoparticles in powder form with a particle size less than about 100 nm, preferably less than about 30 nm.

One embodiment provides a method of making an ionic polymer composite comprising providing at least one mixture comprising a plurality of conductive particles dispersed in an ionic polymer solution, curing the at least one mixture to form at least two ionic polymer layers, and combining at least two ionic polymer layers to form an ionic polymer composite. The ionic polymer solution can be made by mixing one type of SPES polymers in a solvent, such as alcohol, methylpyrrolidone (NMP) dimentylformamide (DMF), dimethylacetamide (DMA), or 2-methoxyethanol. Other suitable ionic polymer includes, but not limited to, other types of SPES polymer, perfluoro-sulfonic polymer (Nafion®) or perfluorocarboxylic polymer (Flemion®), polystyrene-sulfonic polymer and perfluoro-tertiary ammonium polymer, etc. The concentration of the polymer solution may be about 1 to about 50 wt %, preferably about 1 to about 20 wt %, or more preferably about 5 to about 10 wt %. Mixing techniques such as ultrasonication, stirring, spinning, or vortexing can be use to dissolve the polymer in the solvent. For ultrasonication, the duration can range from about 1 minute to several days, preferably about 24 hours or overnight. In some embodiments, two or more mixing methods can be used. For example, incorporating vortexing intermittently with ultrasonication can ensure mixing at both microscopic and macroscopic levels.

In some embodiments, preformed conductive particles are added into the ionic polymer solution to form a polymer-particle mixture of a desired concentration. In some embodiments, the conductive particle concentration may be about 1 to about 2000 mg/ml, or preferably about 10 to about 200 mg/ml. The polymer-particle mixture is again ultrasonicated and vortexing intermittently at room temperature long enough for the well-dispersion of the preformed conductive particles. Surfactants such as tetraoctyl ammonium bromide (TOAB), thio group and dendrimers, etc. may also be used to prevent aggregation of preformed conductive particles. For example, TOAB-protected and thio-protected gold nanoparticles can be formed. In some embodiments, organic surfactant may also be used. In other embodiments, the ionic polymer and the conductive particles may be dissolved or suspended separately to form two separate solutions. The two solutions can then be mixed together using the mixing techniques described above.

After mixing and dispersion of the conductive particles, the polymer-particle solutions can optionally be filtered to exclude defect and un-dissolved/un-dispersed large particles in the solution.

In some embodiments, a high speed mixer can be used to mix the polymer-particle mixture. An example of the high speed mixer is FlackTek SpeedMixer™ DAC 150 FVZ-K. Polymer precursor is added to solvent such as DMF, NMP or DMSO, etc. and premixed in the high speed mixer for about 5 to about 120 minutes, about 20 to about 100 minutes, or about 50 to about 100 minutes. The mixing speed may be from about 500 to about 4000 rpm, about 500 to about 3500 rpm, about 1000 to about 3500 rpm, about 2000 to about 3500 rpm or about 2500 to about 3200 rpm. Then about 1 to about 50 wt % or about 4 to about 32 wt % of conductive particles are added to the mixed polymer solution. The mixture is again mixed for about 5 to about 120 minutes, about 20 to about 100 minutes, or about 50 to about 100 minutes. In some embodiments, different speed may be used for the second mixing. In some embodiments, the high speed mixture provides a force of between about 10 G to about 700 G, about 100 G to about 600 G, about 350 G to about 550 G or about 400 G. In some embodiments, the high speed mixture provides a force of greater than about 10 G, greater than 200 G, greater than about 350 G or greater than 400 G. In some embodiments, the mixing time may be reduced by adding grinding media. Non limiting examples of grinding media include ceramic beads made of $ZrO_2$, $SiO_2$, $MgO$, $CaO$, $Y_2O_3$, $Ce_2O_3$ or derivative thereof. In some embodiments, $ZrO_2$ beads (about 0.1 mm to about 5 mm, or about 1.5 to about 2 mm) are added in to the mixture prior to the mixing. In some embodiments, about 1 to about 100 g, about 1 to about 50 g or about 3 to about 10 g of the $ZrO_2$ beads may be added. The polymer-particle mixture can then be casted to form the ionic polymer layers.

At least two ionic polymer layers may be formed by curing at least one polymer-particle mixture. In some embodiments, each of the two ionic polymer layers may have conductive particles distributed in a portion of the ionic polymer layer, while the other portion contains substantially no conductive particles. For example, during the curing process, the dispersed conductive particles may begin to settle toward the substrate or the bottom of the container/mold due to the gravitational pull. As a result, the upper portion (i.e., away from the substrate or the bottom of the container/mold) of the ionic polymer layer may not have a significant amount of conductive particles for conducting electricity for the device. This portion of the layer may become the dielectric layer 32 of the ionic polymer composite. The portion that contains conductive particles may become the extended electrode layer 31 in the finished composite.

Figure 8A:
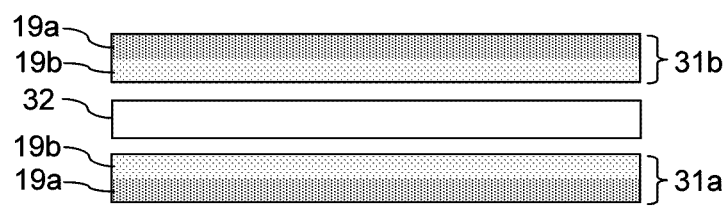
FIG. 8A shows a cross-sectional view of two polymer-particle layers and one ionic polymer dielectric layer to be bonded to form one embodiment of a polymer composite.

In some embodiments, the at least two ionic polymer layers may contain significant amount of conductive particles throughout the entire depth of the layers. These ionic polymer layers would then become the two extended electrode layers 31a and 31b in a finished composite as shown in FIG. 8A.

In other embodiments, two or more polymer-particle mixtures with different conductive particle concentrations may be cured to form two or more ionic polymer layers having different conductive particle concentrations. These ionic polymer layers having different conductive particle concentrations may be combined to form one extended electrode layer 31 with a particle distribution along the thickness/depth of the extended electrode layer 31. The composite can be made by combining two extended electrode layers 31 with a dielectric layer 32 in between.

In some embodiments, a larger strip of extended electrode layer is formed according to the step described above. The large strip can be cut in half to form the first and the second extended electrode layers 31a and 31b.

In some embodiments, each polymer-particle layer 19 may be casted as separate films. In other embodiments, additional polymer-particle layer(s) 19 may be formed directly on top of the already cured polymer-particle layer.

Figure 7:
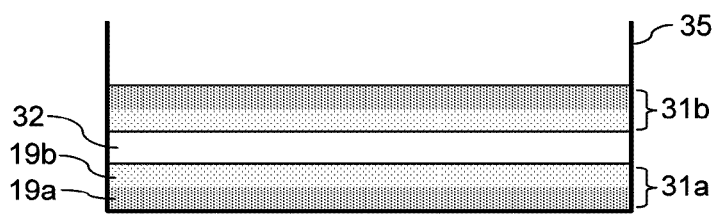
FIG. 7 shows a cross-section of one embodiment of the composite layer formed in a container.

In some embodiments, one of the at least one extended layer may be the first extended electrode layer 31a as depicted in FIG. 7. The first extended electrode layer 31a may comprise more than one polymer-particle layer made from polymer-particle mixtures of the same or different particle concentrations. The mixture is cured on a substrate or in a container/mold 35 at an elevated temperature and/or under vacuum to form a first polymer-particle layer 19a. The container/mold may be made from glass, silicone, Teflon or other materials. The substrate can be glass, silicon, Teflon or polyethylene terephthalate (PET), etc. Spin coating or other printing techniques may be used to form a thin polymer-particle layer if a thin ionic polymer device element is desired.

Optionally, one or more polymer-particle layers having different or the same particle concentration(s) can be formed on and over the first polymer-particle layer 19a. The first extended electrode layer 31a may be a single polymer-particle layer 19 or a combination of several polymer-particle layers. In some embodiments, the first polymer-particle layer 19a has the highest concentration of preformed conductive particles and the second polymer-particle layer 19b has the second highest concentration. In other embodiments, additional polymer-particle layers having lower concentrations can also be formed on and over the second polymer-particle layer 19b. The first set of polymer-particle layers (for example, 19a and 19b) combined would form the first extended electrode layer 31a. The first extended electrode layer 31a has a concentration gradient that decreases from the outer surface of the first polymer-particle layer 19a toward the interface between the first extended electrode layer 31a and the next layer, such as a dielectric layer 32.

In embodiments where the cured polymer-particle layer or membrane is thin and the concentration of conductive preformed conductive particles in the initial mixture is very high, the preformed conductive particles may have a near constant concentration profile along the thickness of the cured polymer-particle layer 19. In other embodiments, a local concentration gradient may form in a cured polymer-particle layer due to the gravity. Such polymer-particle layers may be useful in forming an extended electrode layer 31 as well. A skilled artisan would be able to adjust the concentrations of each polymer-particle mixture for making each polymer-particle layer 19 to result in an extended electrode layer 31 having a particular desired concentration gradient according to embodiments of this invention.

In some embodiments, a separate ionic polymer dielectric layer 32 may be needed to form the composite device. In some embodiment, a pre-made ionic polymer without conductive particles may be used. They are either commercially available or can be pre-cured. In other embodiments, providing an ionic polymer dielectric layer comprises providing a second ionic polymer solution, such as a SPES polymer solution, and forming an ionic polymer dielectric layer 32. The dielectric layer 32 may be formed as a free standing layer or may be formed on or over the first extended electrode layer 31a by curing the second ionic polymer solution. The second ionic polymer solution can be made from any ionic polymer suitable for forming an ion-exchange membrane and the examples are described above.

The second ionic polymer solution may or may not be the same as the first ionic polymer solution used in preparing the polymer-particle mixture. For example, to obtain an anisotropic swelling structure, the ionic polymer dielectric layer 32 may be made from a SPES polymer that has a higher ion exchange capacity (IEC) than the polymer used in making the extended electrode layers. The thickness of the dielectric layer may be about 2% to about 98%, preferably about 20% to about 80%, or more preferably about 40% to about 70% of the entire structure thickness in a dry state.

In some embodiments where the ionic polymer dielectric layer 32 is formed on the first extended electrode layer 31a, a second extended electrode layer 31b may be formed by curing said at least one polymer-particle mixture on or over the ionic polymer dielectric layer 32. The second extended electrode layer 31b preferably has the same type of concentration profile as the first extended electrode layer 31a, but the direction of the concentration gradient is reversed. For example, if multiple polymer-particle layers having different concentrations such as 19a and 19b are formed to make the first extended electrode layer 31a, the same multiple polymer-particle layers are form again over the ionic polymer dielectric layer 32 in the reversed order. The polymer-particle layer with the lowest particle concentration 19b is formed on the dielectric layer 32, and a higher concentration polymer-particle layer 19a is formed on the previous polymer-particle layer 19b. In a preferred embodiment, the first and the second extended electrode layers 31a and 31b together would exhibit a symmetric concentration profile. The thickness of each extended electrode layer 31 may be about 1% to about 49%, preferably about 10% to about 40% and more preferably about 15% to about 30% of the entire polymer composite thickness in a dry state.

Figure 8B:
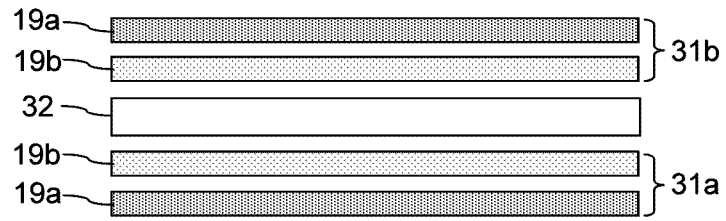
FIG. 8B shows a cross-sectional view of four polymer-particle layers and one ionic polymer dielectric layer to be bonded to form another embodiment of a polymer composite.
Figure 8C:
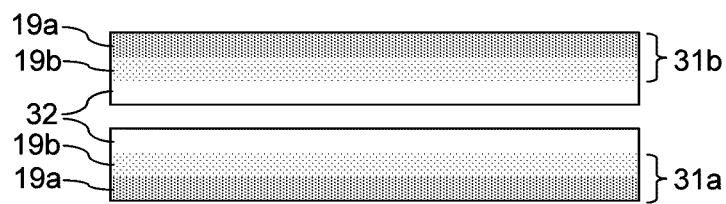
FIG. 8C shows a cross-sectional view of another embodiment of two polymer-particle layers to be bonded to form a polymer composite.

In some embodiments, the polymer composite is formed by combining two of the at least one extended electrode layer and the ionic polymer dielectric layer as depicted in FIG. 8A. The first and the second extended electrode layers 31a and 31b can be fabricated separately using preformed particle dispersion method. Subsequently, the two separately formed extended electrode layers are combined together with an ionic polymer dielectric layer 32 sandwiched in between the two extended electrode layers to form a single ionic polymer composite 11. The layers are combined by bonding them together. In some embodiments, multiple polymer-particle layers that make up each extended electrode layer may also be formed separately and subsequently bonded to form an ionic polymer composite 11 as shown in FIG. 8B. Alternatively, a layer of dielectric ionic polymer may be formed directly on each of the extended electrode layers prior to bonding the two combined layers to form an ionic polymer composite as shown in FIG. 8C.

In-Situ Reduction

Figure 9:
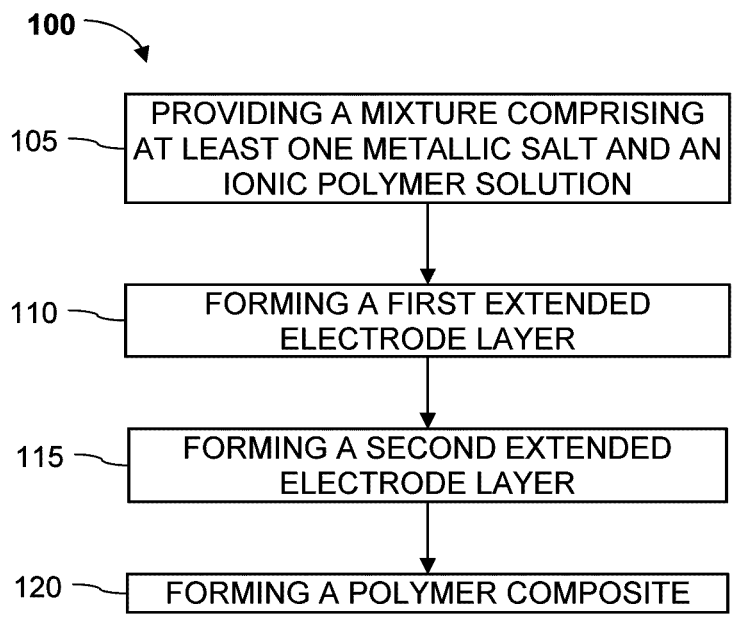
FIG. 9 shows a flow chart illustrating another process for forming the polymer composite of an ionic polymer device of FIG. 1.

Some embodiments provide an in-situ reduction method for forming extended electrode layers in a polymer composite. In some embodiments, the ionic polymer solution can be made by mixing ionic polymers in a solvent. Suitable ionic polymer includes other polymer capable of ion conduction, and the examples are listed above. With reference to FIG. 9, the process for making an ionic polymer device 100 starts at step 105 by providing a mixture comprising at least one metallic salt and an ionic polymer solution. The mixture is a polymer-salt mixture or solution. The metallic salt is added into the ionic polymer solution and stirred rigorously. In some embodiments, the metallic salt may be $HAuCl_4$, $[Au(phen)Cl_2]Cl$, $[Pt(NH_3)_6]Cl_2$, $H_2PtCl_6$ or other Au or Pt salts. In one embodiment, one or more additives may be added to the mixture to improve the properties of the cured polymer, such as adding dimethylformamide (DMF) to prevent the polymer cracking.

The polymer-salt mixture can be transferred to a container configured to a desired dimension and shape for the curing process. In some embodiments, spin coating, printing such as ink-jet printing, or other thin film casting/deposition techniques may be used for making a thin polymer composite membrane. In some embodiments, the curing process may occur at room temperature under vacuum, such as about 0 to about 30 inHg (relative), preferably about 0 to about 15 inHg and more preferably about 5 to about 10 inHg. The cured polymer composite is then annealed at an elevated temperature under vacuum. For examples, at a temperature of about 50 to about 200° C., preferably about 70 to about 150° C. and more preferably about 90 to about 120° C. and under vacuum at about 0 to about 30 inHg (relative), preferably about 10 to about 30 inHg and more preferably about 20 to about 30 inHg. In other embodiments, the curing process may occur at an elevated temperature under vacuum without annealing. For examples, the temperature range may be about 23 to about 150° C., preferably about 50 to about 100° C. and more preferably about 80 to about 90° C., and the vacuum range may be about 0 to about 30 inHg (relative), preferably about 0-15 inHg and more preferably about 5 to about 10 inHg. The most preferably condition would be at about 80° C. and under vacuum at about 5 inHg rel.

The process continues at step 110 by forming the first extended electrode layer 31*a*. When the polymer-salt mixture is partially cured to have a certain viscosity, a first portion of the reducing agent such as sodium citrate, sodium borohydride or HCHO is added to reduce the metallic salt and to form nano- and/or micro-scale metal particles (i.e., conductive particles 12) inside the curing polymer. A skilled artisan would be able to determine when the polymer-salt mixture is partially cured by observation of the curing polymer surface or by measuring the viscosity with a Rheometer. The reducing agent is typically introduced or added over the second surface 18*b* of the curing polymer layer. The second surface 18*b* is oriented so that it faces up and away from the gravitational pull. In some embodiments, a micro-sprayer may be used to introduce the reducing agent to ensure that the droplets are small and uniformly distributed across the second surface 18*b*. The conductive particles 12 precipitate and move toward the opposite first surface 18*a* due to the gravity. The first extended electrode layer 31*a* is formed at and near the first surface 18*a* of the curing polymer. By adjusting the rate of introduction of the reducing agent, a particle concentration gradient with a higher concentration at the first surface 18*a* can be achieved.

After allowing the polymer to cure further, the process continues at step 115 by forming the second extended electrode layer 31*b*. The second portion of the reducing agent is added over the second surface 18*b* when the polymer is nearly cured to form additional metal particles. Since the polymer has become more viscous at this point of the curing process, the reduced conductive particles 12 move toward the first surface 18*a* more slowly and settle at and near the second surface 18*b* to form the second extended electrode layer 31*b*. The process continues at step 120 to form the polymer composite. The mid-section of the cured polymer composition would be substantially free of conductive particles 12, and therefore is an ionic polymer dielectric layer 32.

In some embodiments, various amount of the reducing agent may also be introduced several times at various stages of the curing process to control the concentration profile. In some embodiments, the metallic salt is reduced in the curing polymer solution to form substantially spherical particles with sizes ranged from about 0.1 nm to about 1 preferably about 1 nm to about 100 nm, and more preferably about 1 to about 10 nm. In other embodiments, the metallic salt may be reduced in the polymer composite to form cluster chains with diameters ranged from about 0.1 nm to about 1 preferably about 1 nm to about 100 nm, and more preferably about 1 to about 10 nm and the length ranged from about 1 nm to about 10 μm, preferably about 50 nm to about 1 μm. In some embodiments, surfactant such as tetraoctyl ammonium bromide (TOAB), thio group and dendrimers, etc. may be added to prevent conductive nanoparticles from aggregating.

Some embodiments provide another in-situ reduction method for forming polymer composite, comprising forming at least two polymer layers or blocks and combining them to form a polymer composite. The process begins at mixing the polymer-salt solution as described above in step 105, but the amount of polymer-salt solution used may be adjusted to form a polymer layer with a thickness equal to or less than half of the desired thickness of the final polymer composite 11. The process continues at forming a first extended electrode layer 31*a* as described above in step 110. Instead of continuing to form a second extended electrode layer, the polymer layer 50 with one extended electrode layer is allowed to be cured completely. A person skilled in the art would understand that the rate that reducing agent is introduced can determine the thickness and the concentration profile of the extended electrode layer 31. Two such cured polymer layers 50 may be formed in one step in two separate containers or by cutting one large cured polymer layer 50 into two sections.

Figure 10A:
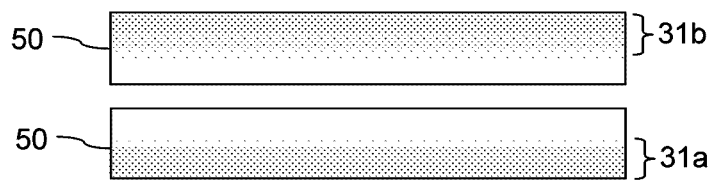
FIG. 10A shows a cross-sectional view of two polymer-particle layers to be bonded to form one embodiment of a polymer composite.

The next step involves forming the multi-layer ionic polymer composite 11 by combining two cured polymer layers 50. One of the cured polymer layers 50 is flipped up-side down so the surface with higher conductive particle concentration is facing up and away from the pull of gravity. In some embodiments, the cured polymer layers 50 may have a narrower concentration gradient, or a part of each of the cured polymer layers 50 may be substantially free of the conductive particles 12 as shown in FIG. 10A. Such two cured polymer layers 50 may be bonded together by joining the surfaces that are substantially free of the conductive particles 12. The portion of each polymer particle layers that is substantially free of the conductive particles 12 together form the ionic polymer dielectric layer 32.

Figure 10B:
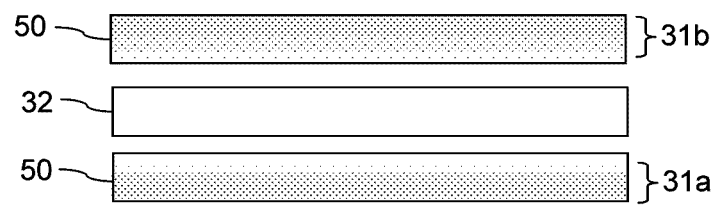
FIG. 10B shows a cross-sectional view of two polymer-particle layers and one ionic polymer dielectric layer to be bonded to form another embodiment of a polymer composite.

In other embodiments where a thicker ionic polymer dielectric layer may be desired, a separate ionic polymer dielectric layer 32 substantially free of conductive particles 12 may be used. The dielectric layer 32 may be a pre-made ionic polymer, either commercially available or pre-cured. As depicted in FIG. 10B, this ionic polymer dielectric layer 32 is sandwiched between the two polymer layers 50 and all layers are bonded together to from a polymer composite 11 as described below.

All the separately formed layers from the above methods (extended electrode layers and/or dielectric layer) or the bonded polymer composite can be cured at room temperature under vacuum, and then annealed at an elevated temperature under vacuum. The vacuum range for room temperature curing is from about 0 to about 30 inHg (relative), preferably about 0 to about 15 inHg and more preferably about 5 to about 10 inHg. The annealing temperature is in the range of about 50 to about 200° C., preferably about 70 to about 150° C. and more preferably about 90 to about 120° C. The vacuum range for annealing is from about 0 to about 30 inHg (relative), preferably about 10 to about 30 inHg and more preferably about 20 to about 30 inHg. In other embodiments, the curing process may occur at an elevated temperature under vacuum without annealing. For examples, the temperature range may be about 23 to about 150° C., preferably about 50 to about 100° C. and more preferably about 80 to about 90° C., and the vacuum range may be about 0 to about 30 inHg (relative), preferably about 0 to about 15 inHg and more preferably about 5 to about 10 inHg.

After the layers made by any method described above are dried, the layers may be bonded together under pressure and elevated temperature in a lamination process to form a multi-layer structure. In some embodiments, a vacuum oven or a heated press may be used for the lamination process. The bonding of the layers involves applying pressure to the stack of layers such as clamping the stack between two glass slides or simply placing heavy weight over the stack. In some embodiments, a small amount of ionic polymer solution may be used as an adhesive between the bonding layers. In some embodiments, solvent such as 2-methoxyethanol or alcohols may be used as an adhesive. The bonded stack was then heated at an elevated temperature ranged from about 50 to about 200° C., about 80 to about 150° C., and more preferably about 90 to about 120° C. under vacuum ranged from about 0 to about 30 inHg (relative), preferably about 5 to about 20 inHg, and more preferably about 10 to about 15 inHg to re-dissolve the adjacent polymer phases and merge all the films together seamlessly to form a polymer composite 11 with a sandwiched structure.

In some embodiments, lamination can be done using a heated press. Conditions for using heated press depend on the thickness of the stack, composite surface area, and the type of material components. In some embodiments, the temperature for the lamination ranges from about room temperature to about 200° C., preferably about 60° C. to about 160° C., or more preferably about 100° C. to about 120° C. In some embodiments, the pressured applied on the layer stack with a total thickness of less than 500 μm ranges from about 1 to about 1000 kgf/cm², preferably from about 20 to about 200 kgf/cm², or more preferably from about 60 to about 120 kgf/cm². In some embodiments, the duration of the bonding may be about 1 second to about 24 hours, about 30 seconds to about 30 minutes, or about 2 to about 10 minutes.

In some embodiments, the lamination can be done in a vacuum oven. The preformed layers are placed and secured in between two glass pieces, and a weight is placed on top of the stack in the oven. The temperature and vacuum conditions are similar or lower to those used in the curing process described above.

In some embodiments, the surface electrodes 13 may be formed during the lamination step. During the lamination, conductive metal foils, meshes or porous thin films may be applied and bonded onto the two outer surfaces of the stack, which would become the first and the second surfaces 18a and 18b of the composite. In some embodiments, the conductive metal foils, meshes and porous thin films may comprise gold, platinum, silver, copper, nickel, etc. In some embodiments, the thickness of the foil or mesh may be from about 10 nm to about 100 μm, preferably about 100 nm to about 10 μm, or more preferably about 1 μm. The surface electrodes formed using this method may allow the passage of water and cation, and may be more resistant to the swelling upon hydration.

In some embodiments, different surface plating techniques may be used to form the surface electrodes after the stack has been bonded. Once the ionic polymer composite with desired particle concentration profile is fabricated using any one of the above methods, at least one conductive layer may be optionally deposited on each of the first and the second surfaces 18a and 18b to form electrodes. The conductive layers ensure good surface conductivity and uniform electric field along the length of the ionic polymer device. In embodiments where preformed layers are combined to form an ionic polymer composite, at least one conductive layer may be deposited onto the surfaces that will become the first and the second surfaces 18a and 18b of the polymer composite. Suitable materials for conductive layers include metals, conductive polymer, graphite or other materials that have good electrical conductivity and resistance to corrosion. In some embodiments, preferred materials for the electrodes 13 are metals such as Au, Pt, Pd, Ir, Ru, RhAg, Al, Ni and Cu, non-metal such as conductive polymers, carbon nanotubes and graphite or other conductive materials. The deposition of the conductive layer can be achieved by any suitable deposition and/or plating method, including but not limited to sputter coating, electroless plating, vacuum deposition, electroplating, applying (such as spraying, painting, brushing, dipping, etc.) conductive paint and bonding during lamination as described above. Surface plating may be carried out when the composite is either hydrated or dehydrated.

In some embodiments, an additional heat pressing step may be performed after the conductive layer has been deposited. The heat pressing may reinforce the adhesion between the conductive layer and the polymer surface. In some embodiments, the heated press is applied to sputter-coated conductive layers. Following the sputter coating, the composite sample was placed in between two Teflon films, which are then sandwiched between two paper carton layers, and two aluminum plates are placed over the carton layers. The sandwiched sample is heat pressed at about 50° C. to about 300° C., about 50° C. to about 200° C., about 80° C. to about 150° C., or about 100° C. to about 120° C. In some embodiments, the temperature of the heated press may be just below the melting temperature of the composite polymer. In some embodiments, the applied force for the heated press may be about 100 Newton (N) to about 20000N, about 100N to about 10000N, about 1000N to about 8000N or about 5000N. In some embodiments, the applied force may be about 0.01 ton to about 2 tons, about 0.01 ton to about 1 ton, about 0.1 ton to about 0.8 ton, or about 0.5 ton. The term "ton" as used herein is ton-force or metric ton, and 1 ton is about 9807N or 1000 kg. In some embodiments the applied force for the heated press may be about 2 kgf/cm² to about 450 kgf/cm², about 2 kgf/cm² to about 250 kgf/cm², about 20 kgf/cm² to about 200 kgf/cm², about 60 kgf/cm² to about 120 kgf/cm², or about 112 kgf/cm².

In some embodiments, sputter coating in a dry vacuum environment may be used to deposit a thin layer of conductive substance. Masks may also be used to apply coating with certain patterns to reduce the effects of the swelling of the polymer when it is hydrated. In some embodiments, the layer thickness may be from about 10 to about 1000 nm or from about 50 to about 200 nm. A person skilled in the art would know how to change the sputter coating parameters depending on the desired layer thickness, the material being deposited and the surface property of the composite. In some embodiments, wet process such as electroplating and electroless plating may be used to form surface electrodes that are not as affected by the swelling of the polymer.

In some embodiments, surface treatments may be performed to increase the surface area for better bonding with the conductive layer. These surface treatments may be surface roughening, plasma surface treatment or other similar treatments. Optionally, a cleaning process such as ultrasonic cleaning or acid washing may also be performed prior to the metal deposition steps.

Since cation movement within the cluster network of an ionic polymer composite upon electrical stimulation causes actuation, the actuation performance can be altered by changing the associated cation. In some embodiments, the cations of the ionic polymer composite can be replaced with one or more of cations such as alkali metal cations, alkaline earth metal cations, poor metal cations and alkyl ammonium via ion-exchange procedures. Alkali metal cations are $Li^+$, $Na^+$, $K^+$, $Rb^+$ and $Cs^+$, etc., alkaline earth metal cations may be $Ca^{2+}$ and $Mg^{2+}$, etc, and poor metal cations may be $Al^{3+}$ and $Tl^{3+}$, etc. Alkyl ammonium cations include but not limited to tetrabutylammonium ($TBA^+$) and tetramethylammonium ($TMA^+$). Different combinations of these cations can be explored to obtain a desired actuation performance and property. In some embodiments, small alkali metal cation samples show a larger deformation rate but a small overall deformation (actuation displacement). In other embodiments, larger alkyl ammonium cation shows larger overall deformation, but a small deformation rate.

In some embodiments, solvent absorption is also performed to allow the interconnected cluster network to form in the ionic polymer composite. As cation movement is aided by the solvent, ionic polymer actuator with different solvent type or amount can show different actuation performance. The solvent includes but not limited to water, organic solvents such as ethylene glycol, glycol, glycerol or crown ethers or ionic liquids such as 1-ethyl-3-methylimidazolium trifluoromethanesulfonate. In some embodiments, the ion exchange and the solvent absorption may also be done prior to depositing the conductive layers.

In some embodiments, improved ionic polymer composite device can be made when the extended electrode layers comprises a SPES polymer or a derivative thereof having an IEC of at least about 1.4 meg/q. In some embodiments, the IEC of the extended electrode layers may be at least about 1.8 meq/g or at least about 2 meq/g. In some embodiments, the IEC of the extended electrode layers may be about 1.5 to about 2.5 meq/g, about 1.8 to about 2.5 meq/g, or about 2 to about 2.4 meq/g.

In some embodiments, the dielectric layer or the center layer of the ionic polymer composite may comprise a SPES polymer or a derivative thereof having an IEC of at least about 1.4 meq/g, at least about 1.8 meq/g, at least about 2 meq/g, about 1.5 to about 2.5 meq/g, about 1.8 to about 2.5 meq/g, or about 2 to about 2.4 meq/g. In some embodiments, all the layers (including the extended electrode layers and the dielectric layer) of the ionic polymer composite may comprise one or more SPES polymer(s) or a derivative thereof, each having an IEC of at least about 1.4 meq/g, at least about 1.8 meq/g, at least about 2 meq/g, about 1.5 to about 2.5 meq/g, about 1.8 to about 2.5 meq/g, or about 2 to about 2.4 meq/g. In some embodiments, the IEC of the dielectric layer is higher than the IEC of the extended electrode layers.

In some embodiments, the displacement %, force output and work density of an ionic polymer composite device can be further improved when the surface electrodes are sputter-coated gold films. The adhesion of the surface electrode film (e.g., metal film) and the polymer surface can be improved when heated press (i.e., heat and pressure treatment) is applied to the surface electrode film after it has been deposited on the polymer surface.

Surface Imprinting

Another embodiment provides a novel method for increasing the interfacial area between the ionic polymer phase and the electrically conductive phase or the electrode by forming an ionic polymer composite with imprinted surface features for contacting the electrodes. Suitable ionic polymer includes any polymer capable of ion conduction, such as SPES polymer, perfluoro-sulfonic polymer (Nafion®), perfluoro-carboxylic polymer (Flemion®), polystyrene-sulfonic polymer and perfluoro-tertiary ammonium polymer. In preferred embodiments, the ionic polymer composite is formed using SPES polymer solution. These polymer solutions are made by methods described above. The imprinted surfaces of an ionic polymer composite comprise nano- or micro-scale surface features such as pores, groove and tunnels.

Figure 11:
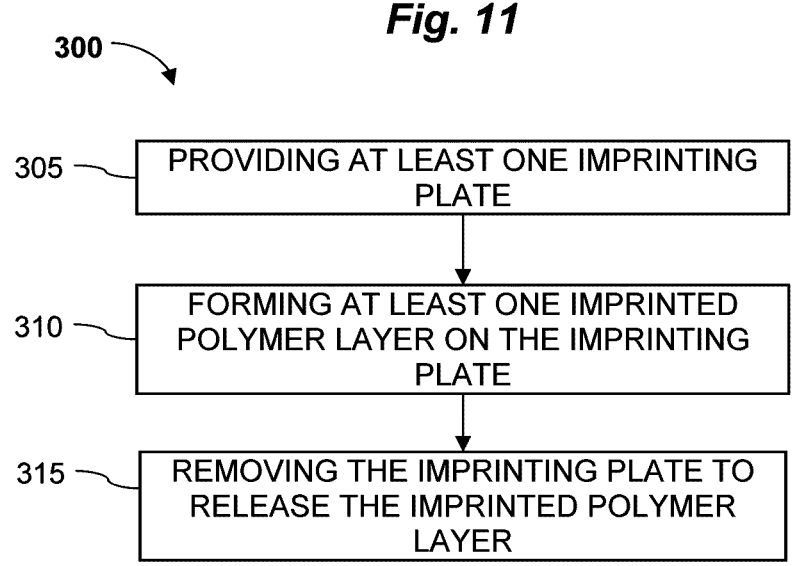
FIG. 11 shows a flow chart illustrating a process for forming the polymer composite of another embodiment of ionic polymer device.

With reference to FIG. 11, the imprinted polymer composite can be fabricated using the process 300, which starts at step 305 by providing at least one imprinting plate 20. At least one imprinting plate 20 is used as a template for creating nano- and/or micro-scale surface features 14 on the two opposite surfaces of an ionic polymer composite 11 that will be in contact with the electrodes 13. The imprinting plate 20 may be any plate with nano- or micro-scale indentation, protrusion and holes, etc. Preferable materials for imprinting plates are semi-conducting and conducting materials such as porous silicon (preferably heavily doped) and etched metal. Metals that are suitable for imprinting plates include, but not limit to: Au, Pt, Pd, Ir, Ru, Ag, Al, Ni and Cu.

In some embodiments, the imprinting plate 20 can be made by electrochemically etching conducting or semi-conducting materials. In one embodiment, a porous silicon imprinting plate can be made by electrochemical etching of a boron-doped, $P^{++}$-type <100> silicon wafer in about 10% hydrofluoric acid (HF) ethanoic/aqueous solution. The HF ethanoic/aqueous solution is made by mixing 48% wt of HF aqueous solution with 200-proof ethanol in a 1:4 volume ratio. Other etching solution may include any combination of a fluoride salt with an acid that can produce $H^+$ and $F^-$. In one embodiment, the etching solution may be a combination of $HNO_3$ and $NH_4F$. In another embodiment, an aluminum foil may be etched by HCl and/or $HNO_3$.

The porosity and the pore size can be tailored by changing the etching conditions. The variable etching conditions are: concentration of the etching solution, duration of etching, applied electrical function, etching sequences and any combination thereof. In some embodiments, HF ethanoic/aqueous solution may be from about 1% to about 99% by volume, preferably from about 5% to about 50% by volume, and more preferably from about 10% to about 38% by volume in concentration. The duration of etching depends on the concentration of the etching solution, and can range from about 1 second to about 1 hour, preferably from about 10 seconds to about 10 minutes and more preferably from about 30 seconds to about 5 minutes. The applied current density also depends on HF concentration, and may be about 1 to about 10,000 $mA/cm^2$ and preferably about 10 to about 2,000 $mA/cm^2$.

The surface of a porous plate may be characterized by scanning electron microscopy (SEM), reflectivity spectrometer, and/or atomic force microscope (AFM). One embodiment of the porous silicon plate exhibits a large porosity and an average pore diameter of less than about 5 nm. In preferred embodiments, imprinting plates 20 have relatively small pores (in nanometer scale) and large pore depth (in micrometer scale), and therefore a high aspect ratio of about 10 to about 100 or more. These imprinting plates also exhibit large porosity (about 70% to about 95% or higher), and thus large surface area to volume ratio. By characterizing and examining the imprinting plate surface, a skilled artisan would be able to adjust the etching parameters and conditions to create desired templates.

In some embodiments, highly porous materials for imprinting plates may be hydrophobic. Since imprinted surface features are made by casting an ionic polymer solution on to the imprinting plate and allowing the polymer solution to diffuse into the porous matrices of the imprinting plate, proper surface modification may be necessary to change the surface chemistry. For example, oxidization (changing Si—H to Si—O) of a silicon imprinting plate can make the surface more hydrophilic, so the ionic polymer solution can penetrate into the holes and indentations on the imprinting plate more easily. In one embodiment, the porous silicon imprinting plate is placed in a furnace at about 600° C. for about 2 hours to oxidize the silicon surface.

Figure 12A:
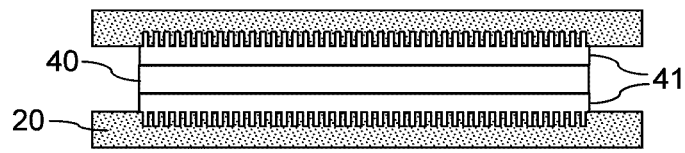
FIG. 12A shows a cross-section of one embodiment of a polymer composite with attached imprinting plates.
Figure 12B:
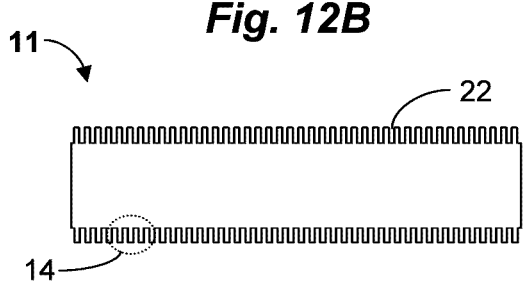
FIG. 12B shows a cross-section of one embodiment of a polymer composite after the imprinting plates have been removed.

The process 300 continues at step 310 by forming at least one imprinted polymer layer on the imprinting plate. Ionic polymer solution is applied or cast onto the imprinting plates 20 and allowed to cure into an imprinted polymer layer 41. One embodiment provides the method of making an ionic polymer composite with surface features by curing a polymer composite between two imprinting plates 20. With reference to FIG. 12A, the polymer solution is applied onto the surfaces of two imprinting plates 20. A solid (pre-cured) ionic polymer 40 may be place in between two imprinting plates with applied polymer solution, and the sandwich structure is clamped down during the curing process. In some embodiments, the polymer solution is introduced into a desired container with two parallel imprinting plates 20. The polymer solution may also be forced into the holes and indentations of the imprinting plates 20 by heat or pressure. Once the polymer solution is cured, the imprinting plates 20 can be removed to yield a free-standing ionic polymer composite 11 having surface features 14 such as pores, tunnels or grooves on two opposite surfaces as depicted in FIG. 12B.

Figure 13:
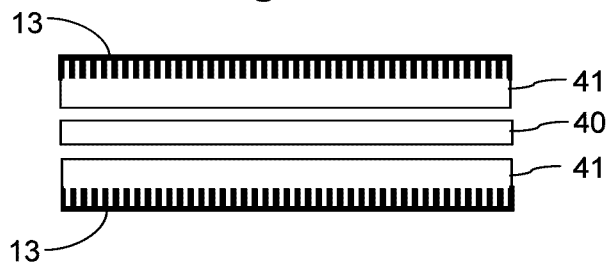
FIG. 13 shows a cross-sectional view of two imprinted layers and a solid ionic polymer layer to be bonded to form one embodiment of the ionic polymer device.

In other embodiments, polymer composites with nano- or micro-scale features/pores can also be fabricated by imprinting one surface at a time. The polymer solution is applied onto at least one imprinting plate 20 and allowed to cure to form an imprinted polymer 41. In some embodiments where a thin polymer layer is cast onto a single imprinting plate, additional polymer solution may be applied or added onto the thin polymer layer as a reinforcement layer while it is still attached to the imprinting plate 20. Once the imprinted polymer layer is cured and released from the imprinting plates 20 (as describe in the step 315 below), two imprinted polymer layers may be bonded together with surface features facing outward to form a polymer composite 11. Additional polymer solution or solvent may be used as an adhesive between the two imprinted layers. Alternatively, the separately cured imprinted layers may also have at least one conductive layer 13 deposited/plated on the surface features 14 first prior to bonding by joining the surfaces without the surface features (FIG. 13). The deposition/plating of the conductive layer 13 is the same as described above.

In some embodiments, a polymer-salt solution made by step 105 can be used to make the imprinted polymer layer 41, and the reducing agent 19 is added as described in step 110 to form conductive particles 12 at and near the surface with surface features 14. In other embodiments, a polymer-particle mixture made by step 205 can also be used to make the imprinted polymer layer 41. The same technique described in step 210 is used to form an extended electrode layer with the imprinted surface 22. In embodiments where conductive particles, either formed by in-situ reduction or preformed particle dispersion method, a dielectric ionic polymer layer 40 may be used as a center layer when bonding two imprinted layers comprising conductive particles together to form an ionic polymer composite 11.

The process 300 continues at step 315 by removing the imprinting plate to release the imprinted polymer layer. Removing imprinting plates may comprise chemical etching with an acid or a base. In some embodiments where porous silicon templates are used, the porous silicon imprinting plate can be removed by etching away its surface structures with a strong base such as NaOH or KOH, thereby releasing the imprinting plates 20 from the newly formed porous surfaces of polymer composite 11. The polymer composite 11 with attached imprinting plates 20 is typically immersed in the etching solution to allow the polymer composite 11 to pill off the attached imprinting plates. In some embodiments, the polymer composite 11 or polymer layer with attached imprinting plates may also be soaked in a basic solution such as NaOH for several hours to allow the imprinting plates to be removed. The free-standing polymer composite 11 is allowed to dry in air.

In the illustrated embodiments, once the polymer composite 11 is released from the imprinting plate 20, one or more conductive layers 13 may be deposited on both porous surfaces of the polymer composite 11 to form electrodes. In some embodiments, the at least one conductive layer also substantially covers the plurality of surface features. Suitable materials for conductive layers include metals, conductive polymer, graphite or other materials that have good electrical conductivity and resistance to corrosion. Preferred materials for the electrodes 13 are metals such as Au, Pt, Pd, Ir, Ru, RhAg, Al, Ni and Cu, non-metal such as conductive polymers, carbon nanotubes and graphite or other conductive materials. The deposition of the conductive layer can be achieved by any suitable deposition and/or plating method described above.

In other embodiments, conductive imprinting plates may also serve as electrodes without having to remove the imprinting plates or depositing additional conductive layer. The imprinting plates that are suitable for serving as electrodes are electrically conductive at least along the direction of the thickness of a polymer composite. In some embodiments, the imprinting plates 20 are also mechanically flexible (low bending stiffness). This is usually the case when the imprinting plates are very thin. Sometimes a final surface plating/coating step may be necessary to improve the surface conductivity of the attached imprinting plates. Non-limiting examples of such imprinting plates include: freestanding thin porous silicon film etched from a heavily doped silicon wafer, porous metallic foil such as aluminum, gold or platinum, a network structure consisting of electrically conductive wires, and other non-metallic materials such as a conductive polymer. A freestanding thin porous silicon film may be fabricated from electrochemical etching of a heavily boron doped, $P^{++}$-type <100> silicon wafer. The electrically conductive wires include wires made of metal, silicon, carbon and carbon nanotubes, etc.

Since cation movement within the cluster network of an ionic polymer composite upon electrical stimulation causes actuation, the actuation performance can be altered by changing the associated cation. In some embodiments, the cations of the ionic polymer composite can be replaced with one or more of cations such as alkali metal cations, alkaline earth metal cations, poor metal cations and alkyl ammonium via ion-exchange procedures. Alkali metal cations are $Li^+$, $Na^+$, $K^+$, $Rb^+$ and $Cs^+$, etc., alkaline earth metal cations may be $Ca^{2+}$ and $Mg^{2+}$, etc, and poor metal cations may be $Al^{3+}$ and $Tl^{3+}$, etc. Alkyl ammonium cations include but not limited to tetrabutylammonium ($TBA^+$) and tetramethylammonium ($TMA^+$). Different combinations of these cations can be explored to obtain a desired actuation performance and property. In some embodiments, solvent absorption is also performed to allow the interconnected cluster network to form in the ionic polymer composite. As cation movement is aided by the solvent, ionic polymer actuator with different solvent type or amount can show different actuation performance. The solvent includes but not limited to water, organic solvents such as ethylene glycol, glycol, glycerol or crown ethers or ionic liquids such as 1-ethyl-3-methylimidazolium trifluoromethanesulfonate. In some embodiments, the ion exchange and the solvent absorption may also be done prior to depositing the conductive layers.

A cantilevered strip of an embodiment of ionic polymer device produced by the method of this invention can undergo a large bending vibration when a small alternating current (AC) such as about 1 to about 2 volts is applied across its thickness. In embodiments where the ionic polymer device is configured as an actuator, the amplitude of bending vibration can be from about 5% to about 100% of the gage length. When a direct current (DC) is applied, the sample shows a fast bending motion toward the anode, followed by a slow motion in the same or opposite direction. In other embodiments, when the ionic polymer member is suddenly bent, a small electric potential at about several mV is produced across its surfaces, and can act as a sensor.

Potential applications of an ionic polymer device include, but not limited to, forming flexible manipulators for endoscopic surgery, catheter tips and guide wires, implantable micro pumps, lids of micro drug delivery devices with controlled drug release rate, artificial muscles, and deformation sensors (for bending, shearing or rotating). Some embodiments provide a medical device comprising an ionic polymer device or element, wherein the ionic polymer device can drive the motion and manipulate or guide the advancement of the medical device. For example, an endoscopic surgical tips may comprise one or more ionic polymer actuator elements/devices for controlling blades, scalpel, needle, needle holder/driver, hook, spatula, delivery instrument, endoscope, fiberoptic cable, light guide, forceps, scissors, dissector, shears, monopolar and bipolar electrocautery, clip applier and grasper. In some embodiments, more than one ionic polymer actuator elements can also be used to control the motion of more than one tip to achieve sophisticate motions and operations. In some embodiments, polymer actuators attached to, or integrated into the wall of a flexible catheter tube or cannula may control the bending motion of the catheter at a certain direction for a certain degree. Multiple segments of the tube wall are covered by separate ionic polymer device for an easy maneuver.

Example 1

Casted SPES-SNP 2-Layer Film

To fabricate this extended electrode film, the polymer-particle solutions are prepared from QuantumSphere® silver nanoparticles, SPES-IIc (IEC=1.44), and DMF as solvent. Certain concentrations of SNP are dispersed in 5 w.t. % polymer solutions. The polymer-particle solutions are filtered before use. The silicone mold has a surface area of 21 cm$^2$ and a substrate of PET covered glass. The first layer is casted from 1.3 mL of 150 mg/mL polymer-SNP solution, at 60-80° C. temperature ramp for 1 hr, and then 80-100° C. temperature ramp for 2 hrs. A low vacuum of relative −5 inHg and an air flow rate of 20 L/min are maintained throughout the process. The second layer is casted from 3.0 mL of 20 mg/mL polymer-SNP solution on top of the first layer under the same conditions. The black color film is obtained and peeled off after cooling down. The bottom surface has a dull feature and a low surface resistivity of 2 ohm across the entire film along the length when measured with a multimeter, due to the very high concentration of SNP. While the upper surface shows a shiny polymer feature and has an infinite ohms of resistance, due to the very low concentration of SNP.

Figure 14A:
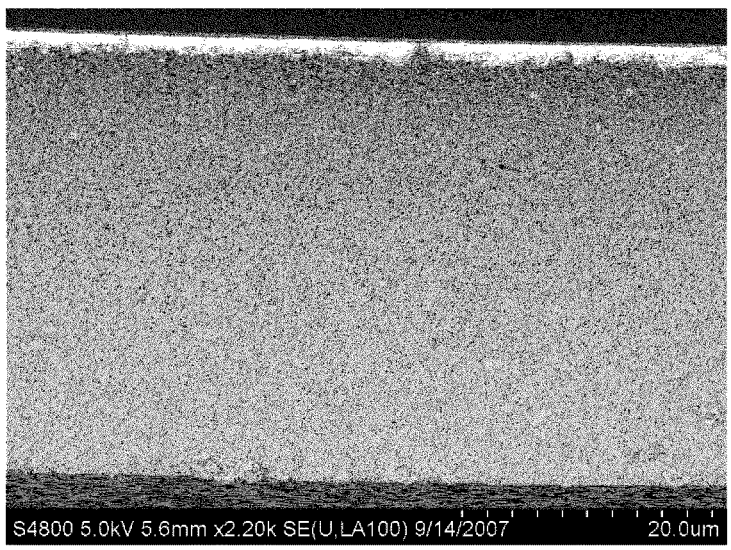
FIGS. 14A to 14C are scanning electron microscopy (SEM) images showing electrode morphology of one embodiment of the polymer composite.
Figure 14B:
Figure 14C:
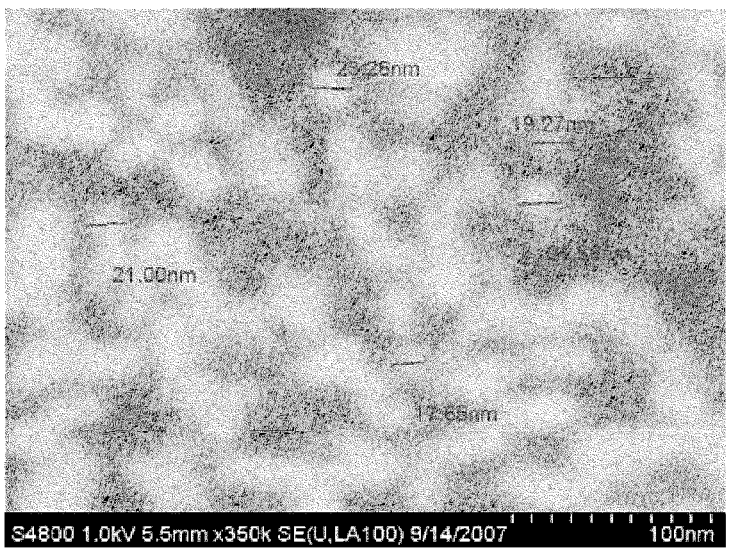

FIGS. 14A-C shows morphology on the cross section, observed with a high-resolution SEM. In these SEM images, the bright region indicates presence of SNP (conductive), while the dark region indicates the presence of polymer (less conductive). The very bright strip near the upper surface is formed due to the charging of the polymer from electron beam, indicating that little or no SNP is present in this region. FIG. 14A shows the concentration gradient of SNP, increasing from upper surface to bottom surface, due to gravitation. The interface between two layers is not distinguishable, because when dispensing the solution for the second layer, the upper surface of the first layer dissolved and merged with the casted second layer. FIG. 14B is the magnified region near lower surface on the cross section, showing closely packed SNP, almost free of aggregation. High-magnification (×350 k) image FIG. 14C shows the individual SNP size of ~20 nm.

Example 2

Casted SPES-CNP 1-Layer Film

To fabricate this extended electrode film, the composite solutions are prepared from Ketjen Black carbon nanoparticles, SPES-IIa (IEC=1.27), and NMP as solvent. 111 mg of SPES polymer was first dissolved in 2 mL of NMP solvent (5.3% wt). After ultrasonication bath overnight, 50 mg of Ketjen Black was added to the polymer solution, again ultrasonication bath overnight. The resulting concentration of CNP in the solid film is 31 w.t. %.

Figure 15A:
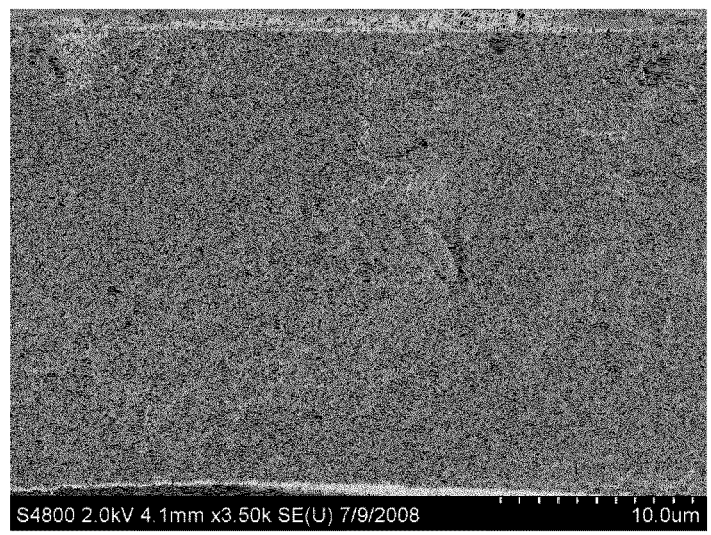
FIGS. 15A to 15D are SEM images showing electrode morphology of another embodiment of the polymer composite.
Figure 15B:
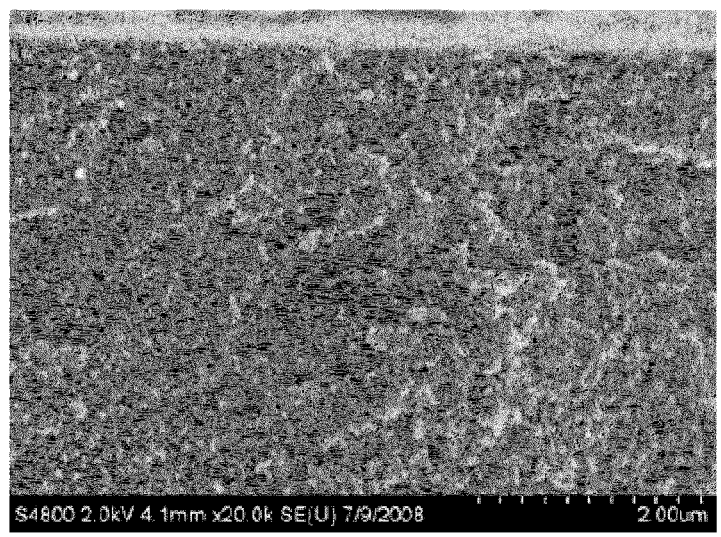
Figure 15C:
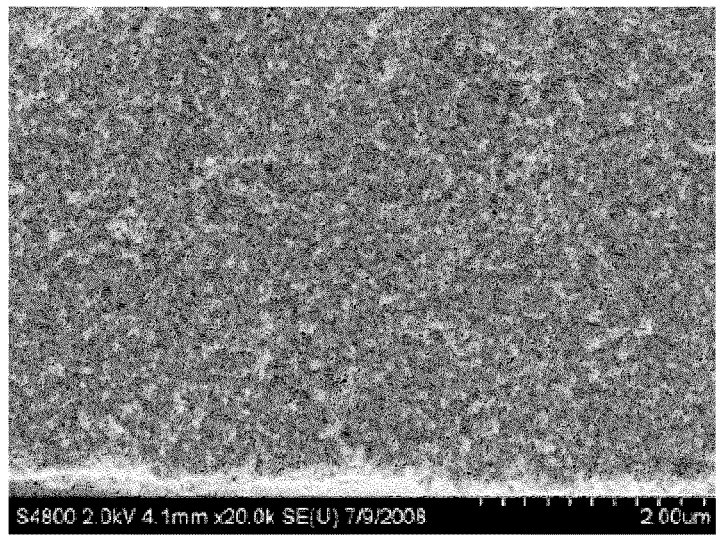
Figure 15D:
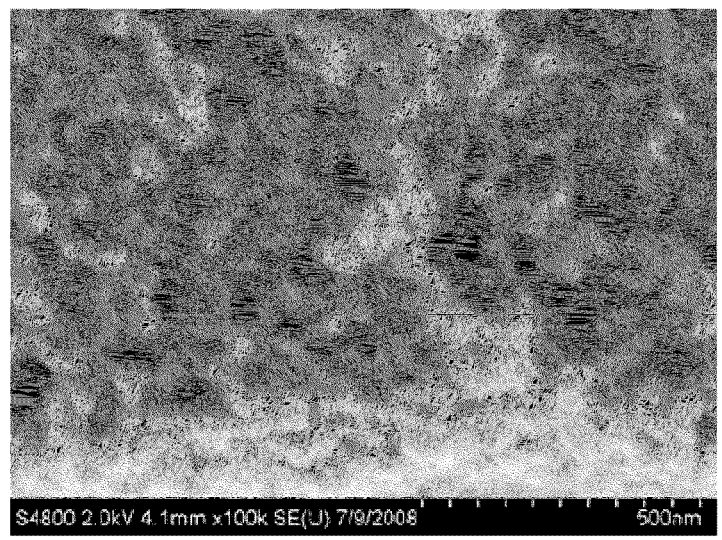

FIGS. 15A-D shows morphology on the cross section, observed with a high-resolution SEM. Because both CNP and matrix polymer are consisted of carbon, it is less easy to distinguish two phases except from topology. FIGS. 15A-C show the composite film has an almost constant CNP concentration along the thickness. The very large surface area and light weight of CNP result in a homogeneous composite film. FIG. 15D shows closely packed individual CNP size ranging from 30-50 nm.

Example 3

Fabrication of SPES-SNP Actuator Device

A 10 w.t. % polymer solution was prepared by mixing and dissolving SPES-IIc (IEC=1.44) which initially started in solid powder form, with the solvent DMF. In addition, DMF was combined with Quantum Sphere silver nanoparticles at two different concentrations: 300 mg/ml and 40 mg/ml. All three solutions were ultrasonicated in an ultrasonicating bath for 24 hours, vortexing intermittently, three times. The SPES polymer solution was then combined with both silver nanoparticle solutions, to make two final concentrations of 150 mg/ml and 20 mg/ml in a 5 w.t. % polymer solution. After combining, these final solutions were placed in an ultrasonicating bath for 24 hours, vortexing intermittently, three times. After dispersion, both solutions were filtered using a 5 μm syringe filter.

The next step involved casting the two composite solutions. The higher concentration composite solution was casted first, and after curing, the lower concentration composite solution was casted directly on the first layer, and cured once again. The 21.0 cm$^2$ silicone mold which was used was prepared by applying a PET covered piece of glass on the bottom of the mold, and then cleaning with ethanol. Also, confirmation of the evenness of the surface was done using a leveling device. After the oven temperature reached 60° C., the higher concentrated solution was applied to the mold. First, 1.5 ml of the 150 mg/ml solution composite solution was applied using a plastic pipet. Once the solution was evenly spread, the oven temperature was increased to 80° C., and the flow rate was set to 20 L/min and the vacuum is set as relative negative 3 in Hg. The first layer was cured at these conditions for 1 hour. After an hour, the temperature was increased to 100° C., and was left at those conditions for two hours. The temperature was then decreased back to 60° C., and was left in the oven overnight. The next day, the second layer was applied: 4.5 ml of the 20 mg/ml solution, in an even layer, also using a plastic pipette. The temperature started at 60° C. and increased to 80° C. at the same flow rate and vacuum setting, for 1 hour. Then, the temperature was increased to 100° C. for 2 hours, keeping the same flow rate.

After cooling, the membrane was removed from the PET covered glass. Care was taken when removing the cured membrane to ensure no cracking. The edges of the membrane were removed, and thickness and conductivity measurements were taken. The average thickness was 80 μm, and the resistance was 3-5 ohm on the bottom surface and ∞M ohm on the top surface (along the length), with the cross section measuring at ∞M ohm. Pictures of cross-sections of the films were taken using SEM to view the size and distribution of the silver nanoparticles.

Figure 16A:
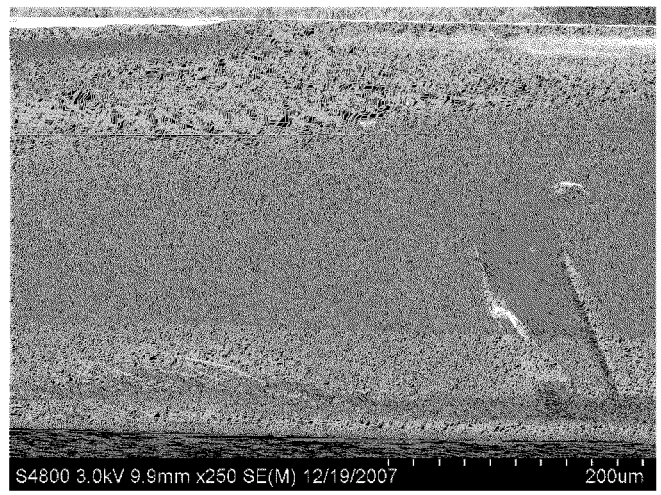
FIGS. 16A to 16B are SEM images showing cross-sectional views of one embodiment of the bonded polymer composite.
Figure 16B:
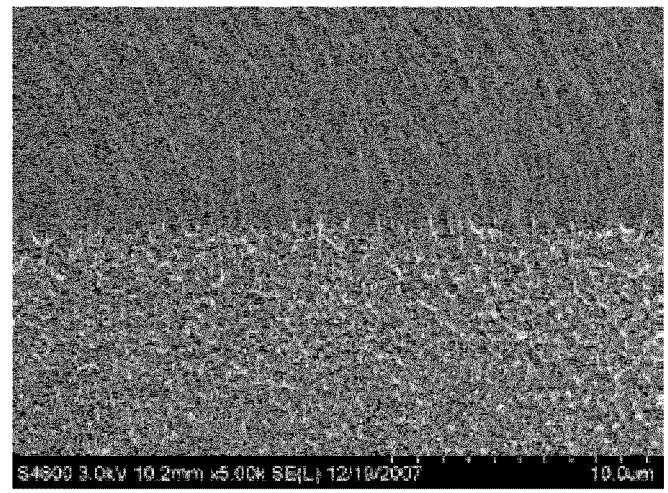
Figure 17:
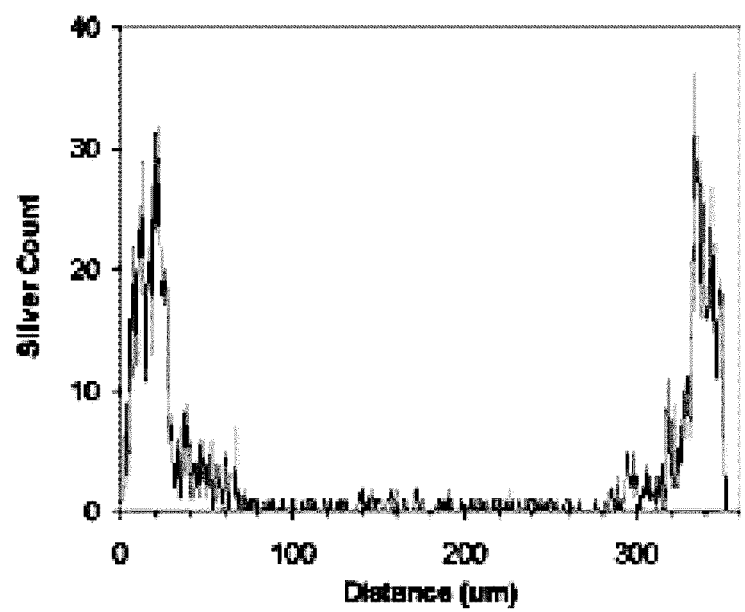
FIG. 17 is an energy dispersive x-ray scattering analysis (EDX) line scan showing distribution of conductive particles in one embodiment of the polymer composite.

After analysis, the film is cut into two halves, which were then boned together with a neat polymer film (i.e., dielectric layer). The neat polymer film is prepared separately from SPES-Ib (IEC=2.37) with a film coater and a multi-layer casting technique. The two pieces of composite layers had an average thickness of 69 and 63 μm respectively. The central neat polymer had an average thickness of 132 μm. The three layers were stacked together, with neat polymer in the center, more conductive surfaces of the composite films facing outside. 2-Methoxyethanol was applied in between adjacent layers as adhesive. A symmetric actuator-sensor structure was then laminated by using a heated press at a pressure of 70 kgf/cm$^2$, and a temperature of 105° C., for 5 min. The resulting surface conductivity was good, so no addition surface plating was necessary for this sample. FIG. 16 is the SEM of the laminated SPES-SNP composite structure, and it shows complete integration of two adjacent layers at the interface without separation. The energy dispersive x-ray scattering analysis (EDX) line scan on the cross section of the composite is shown in FIG. 17. The silver distribution along the thickness of the composite formed the desired concentration gradient and profile.

Example 4

Fabrication of SPES-CNP Actuator Device

A similar fabrication method as described in Example 3 was also followed using Ketjen Black, a type of carbon nanoparticle (CNP) manufactured by Lion Corp. SPES-IIa (IEC=1.27) in powder form, was first combined with the solvent NMP to make a 5.3 w.t. % solution, and was ultrasonicated in an ultrasonicating bath overnight, vortexing intermittently, 3 times. The CNP was then combined directly with the polymer solution, at a concentration of 15 mg/ml. The same mixing process was repeated, ultrasonicating overnight and vortexing intermittently 3 times. Once the solution was prepared, casting was completed in a 10 cm$^2$ silicone mold, directly on the silicon mold surface, with no syringe filtration or additional substrate. Confirmation of the evenness of the mold was done using a leveling device. 2 mL of the composite solution was used. The first stage of curing started at 70° C., and increased to 90° C., for one hour, with the same flow rate and vacuum setting. After an hour, the temperature was increased to 110° C. for 2 hours. The average thickness of the membrane is 60 μm, with a CNP concentration of 21 w.t. % in the dry solid polymer. Resistivity measurements were 20 ohm/square at 50 mA for both sides of the membrane, measured with a four-point probe at dry state.

Bonding of the composite films with the neat polymer layer was completed. SPES-Ib (IEC=2.37) were used to prepared the neat polymer membrane. The neat polymer membrane was placed in the center, and the bottom surfaces of the composite membrane were facing outside. This is because the upper surface of the composite film tends to have a much smoother surface, which makes the bonding a lot easier. In the heated press, the temperature for bonding was 120° C., and the pressure applied was ¾ ton for a total of 5 minutes. Surface coating was then applied to both sides of the membrane through gold sputter coating to increase surface conductivity.

Example 5

The actuation displacements and force outputs of a commercial Nafion actuator and two SPES actuators were compared. The commercial Nafion actuator (sample A) has a thickness of 202 μm, the extended electrode layer comprises reduced Pt nanoparticles, and the surface electrode is Pt. The two SPES actuators were prepared according to the method described above. Sample B has a thickness of 328 μm, the extended electrode layer comprises CNP (21% by wt in SPES-IIa, IEC=1.27), and the surface electrode is laminated copper mesh foil (1-500 mesh, 5.6 μm thick). Sample C has a thickness of 576 μm, the extended electrode layer comprises CNP (21% by wt in SPES-IIa, IEC=1.27), and the surface electrode is sputtered gold (about 120 nm). Both samples B and C have a neat polymer layer of SPES-Ib (IEC=2.37), and both have anisotropic swelling structure A 1.0 V and 0.25 Hz step function input voltage is applied to all samples. The actuation displacements were measured with a laser displacement sensor in air. The normalized displacement is calculated by dividing the actuation displacement amplitude at each side with the sample free length (in %.) The force output is measured with a 10 gram load cell at the zero displacement position (blocked force), in the unit of gram force (gf.) The actuation work density is calculated from normalized displacement times the blocked force (i.e., force output). Sample A showed large actuation displacement but very small force output, while Samples B and C showed smaller actuation displacements, but much larger force outputs and good reliability. The actuation displacements for Samples B and C are smaller due to their increased thicknesses. The actuation force output of Samples B and C is about 11 and 30 times higher than that of Sample A, respectively. The actuation work density output of Samples B and C is about 9 and 6 times higher than that of Sample A, respectively. A 2.0 V and 0.25 Hz step function input voltage is also applied to all samples, and similar results were obtained. At 2.0 V, the actuation force output of Samples B and C is about 11 and 40 times higher than that of Sample A, respectively. The actuation work density output of Samples B and C is about 8 and 4 times higher than that of Sample A, respectively. The results are summarized in Table 1 and 2 below.

TABLE 1

Actuation force output and displacement at 1.0 V input voltage

| Sample | Force Output (gf) | Normalized actuation displacement (% of free length) | Work density (mgf) |
|---|---|---|---|
| A | 0.04 | 21 | 8.4 |
| B | 0.45 | 17 | 77 |
| C | 1.2 | 4.2 | 50 |

TABLE 2

Actuation force output and displacement at 2.0 V input voltage

| Sample | Force Output (gf) | Normalized actuation displacement (% of free length) | Work density (mgf) |
|---|---|---|---|
| A | 0.086 | 61 | 52 |
| B | 0.96 | 42 | 403 |
| C | 3.7 | 5.8 | 215 |

Example 6

The sensing voltage outputs of a commercial Nafion actuator and a SPES actuator were compared. The commercial Nafion actuator (sample A) has a thickness of 202 μm, the extended electrode layer comprises reduced Pt nanoparticles, and the surface electrode is Pt. The SPES actuator was prepared according to the method described above. Sample D has a thickness of 212 μm, the extended electrode layer comprises CNP (31% by wt in SPES-IIa, IEC=1.27), the surface electrode is electroplated gold (21 mA, 60 min), and a neat polymer layer of SPES-Ib (IEC=2.37).

A sensing current is generated across the thickness of the samples by bending and release the tips of the ionic polymer composites. The displacement and the calculated displacement rate are compared with the voltage output. The sensitivity is defined by the amount of voltage output per unit of displacement. The sensitivity of Sample D is about 20 times higher than that of Sample A. The results are summarized in Table 3 below.

TABLE 3

Results for voltage output and sensitivity.

| Sample | Voltage Output (mV) | Sensitivity (mV/mm) |
|---|---|---|
| A | 0.6 | 0.04 |
| D | 8.5 | 0.88 |

Example 7

Fabrication of SPES-CNP actuator devices: Sample E-1: 0.81 g of polymer precursor SPES-IIb (IEC=2.06) was added to 8 ml of N-methylpyrrolidone (NMP) in a container, and the container was positioned in the holder of a high speed mixer (FlackTek SpeedMixer™ DAC 150 FVZ-K, Flacktek, Inc., Landrum, S.C.). After the initial mixing at 3000 rpm for 90 minutes, 0.14 g of CNP was added into the mixed polymer solution. The mixture was then mixed in the high speed mixer at 3000 rpm for 75 minutes. The mixed solution was poured into a cast mold for casting. The curing occurred at 70° C. for 180 minutes to form an extended electrode layer membrane. The average thickness of the membrane was 110 μm, with a CNP concentration of 15 w.t. % in the dry solid polymer.

Bonding of the extended electrode layer membranes with the neat polymer layer was done in a heated press. SPES-IIb (IEC=2.06) was used to prepared the neat polymer membrane. The neat polymer membrane was placed in the center, and the bottom surfaces of the extended electrode layer membrane were facing outside. In the heated press, the temperature for bonding was 104° C., and the pressure applied was 0.5 ton for a total of 10 minutes. Surface coating was then applied to both sides of the membrane through gold sputter coating (2 minutes) to increase surface conductivity. To enhance the adhesion at the gold surface coating and polymer interface, the composite was put in the heated press at 104° C. at a pressure of 0.5 ton for 5 minutes after the sputter coating.

Samples E-2 and E-3 were prepared using the same procedure as described above, except the neat polymer layers of E-2 and E-3 were made using SPES-Ia (IEC=1.35) and SPES-Ib (IEC=2.13), respectively. The average thicknesses of E-2 and E-3 were 305 μm and 306 μm.

Sample F-1, F-2 and F-3 were prepared using the same procedure as described above with the following exceptions. The amounts of CNP added to the SPES-IIb for these three samples were 0.24 g, which resulted in a CNP concentration of 23 w.t. % in the dry solid polymer. The neat polymer layers in F-1, F-2 and F-3 were made using SPES-IIb (IEC=2.06), SPES-Ia (IEC=1.35) and SPES-Ib (IEC=2.13) SPES, respectively.

Samples G was prepared using similar procedure as described above. 0.17 g of SPES-IIb was added to 2 ml of NMP and mixed in the high speed mixer at 3000 rpm for 75 minutes. 0.032 g of CNP was then added into the mixed polymer solution and mixed in the high speed mixer at 3000 rpm for another 90 minutes. The mixed solution was poured into a cast mold for casting. The curing occurred at 60° C. for 180 minutes to form an extended electrode layer membrane. The average thickness of the membrane was 58 μm, with a CNP concentration of 16 w.t. % in the dry solid polymer. The bonding of the composite and the surface coating were under the same condition as described above.

Samples H-1 and H-2 were prepared using similar procedure as described above. 0.17 g of SPES-IIb was added to 2 ml of NMP and mixed in the high speed mixer at 3000 rpm for 60 minutes. 0.032 g of CNP was then added into the mixed polymer solution and mixed in the high speed mixer at 3000 rpm for another 50 minutes. The mixed solution was poured into a cast mold for casting. The curing occurred at 60° C. for 180 minutes to form an extended electrode layer membrane. The average thickness of the membrane was 94 μm, with a CNP concentration of 16 w.t. % in the dry solid polymer. The bonding of the composite and the surface coating were under the same condition as described above.

Example 8

Figure 18:
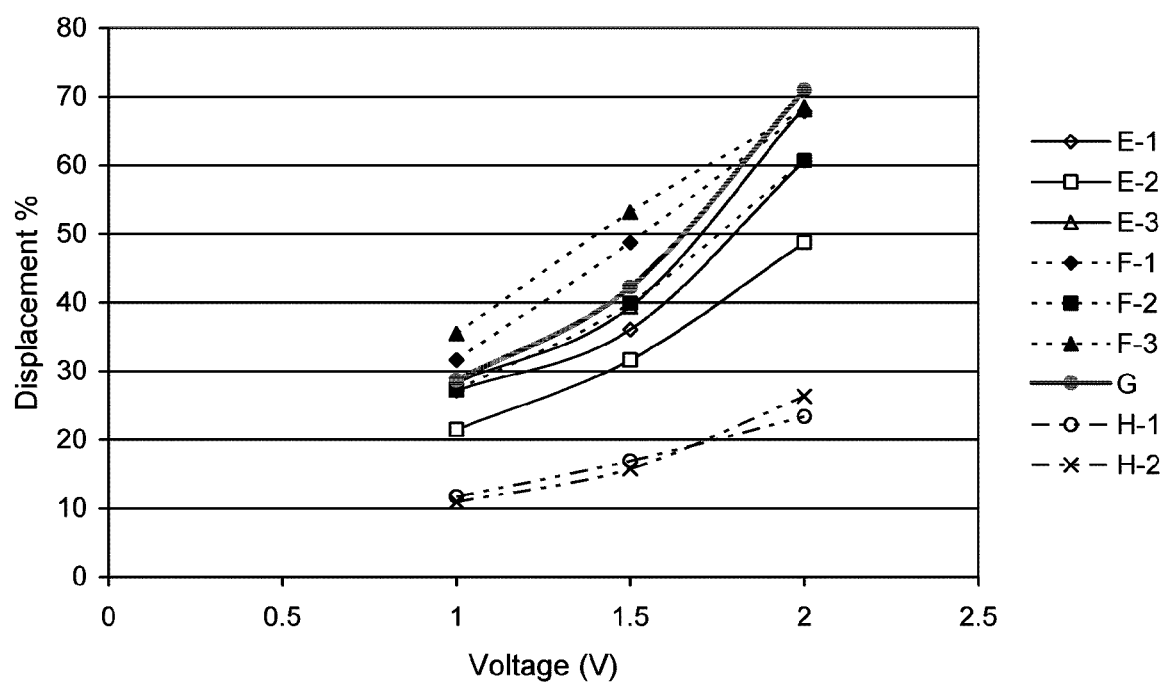
FIG. 18 is a plot of displacement % as a function of input voltage for several polymer composite devices.

The actuation displacements of Samples E-1, E-2, E-3, F-1, F-2, F-3, G, H-1 and H-2 were compared. The compositions and IEC values of the extended electrode layers and the center layer for each sample are summarized in Table 4. All samples have thicknesses of about 300 μm. 1.0 V, 1.5 V and 2.0 V and 0.25 Hz step function input voltages were applied to all samples. The actuation displacements were measured with a laser displacement sensor in air. The normalized displacement is calculated by dividing the actuation displacement amplitude at each side with the sample free length (in %.) FIG. 18 shows a plot of displacement at different applied voltages for all the samples. The samples with high IEC extended electrode layers show larger displacement % than those with lower IEC extended electrode layers (e.g., samples H-1 and H-2). The samples with both high IEC extended electrode layer and high IEC center polymer layer generally have larger displacement % than the counter part samples with high IEC extended electrode layer and low IEC center polymer (e.g. E-3 vs. E-2).

TABLE 4

The compositions and IEC values for SPES-CNP actuator devices

| | Extended Electrode Layer | | Center Polymer Layer | |
|---|---|---|---|---|
| Sample | Composition | IEC | Composition | IEC |
| E-1 | SPES-IIb/15% CNP | 2.06 | SPES-IIb | 2.06 |
| E-2 | SPES-IIb/15% CNP | 2.06 | SPES-Ia | 1.35 |
| E-3 | SPES-IIb/15% CNP | 2.06 | SPES-Ib | 2.13 |
| F-1 | SPES-IIb/23% CNP | 2.06 | SPES-IIb | 2.06 |
| F-2 | SPES-IIb/23% CNP | 2.06 | SPES-Ia | 1.35 |
| F-3 | SPES-IIb/23% CNP | 2.06 | SPES-Ib | 2.13 |
| G | SPES-IIb/16% CNP | 2.06 | SPES-Ib | 2.13 |
| H-1 | SPES-Ia/16% CNP | 1.35 | SPES-Ib | 2.13 |
| H-2 | SPES-Ia/16% CNP | 1.35 | SPES-Ia | 1.35 |

Example 9

The actuation displacements, force outputs and work density of sample F-3 were compared with that of samples A and B. The measurements were made according to EXAMPLE 5. The results are summarized in Tables 5 and 6 below. Sample F-3 has high IEC extended electrode layers and a high IEC center polymer layer. Sample B has low IEC extended electrode layers and a high IEC center polymer layer. Sample F-3 shows improved force output, displacement % and work density as compared to the commercial Nafion actuator (sample A, thickness 202 μm) and sample B. Specifically, the work density of sample F-3 is over 64 times and almost 28 times higher than that of the commercial Nafion actuator at 1.0 V and 2.0 V, respectively. The work density of sample F-3 is 7 times and 3.6 times higher than that of sample B at 1.0 V and 2.0 V, respectively. The force output of sample F-3 is more than tripled and doubled that of sample B (both samples having similar thicknesses) at 1.0 V and 2.0 V, respectively. The displacements of sample F-3 at 1.0 V and 2.0 V are 2 times and 1.6 times of that of sample B, respectively.

TABLE 5

Actuation force output and displacement at 1.0 V input voltage

| Sample | Force Output (gf) | Normalized actuation displacement (% of free length) | Work density (mgf) |
|---|---|---|---|
| A | 0.04 | 21 | 8.4 |
| B | 0.45 | 17 | 77 |
| F-3 | 1.53 | 35.5 | 543 |

TABLE 6

Actuation force output and displacement at 2.0 V input voltage

| Sample | Force Output (gf) | Normalized actuation displacement (% of free length) | Work density (mgf) |
|---|---|---|---|
| A | 0.086 | 61 | 52 |
| B | 0.96 | 42 | 403 |
| F-3 | 2.16 | 68.1 | 1451 |

It is appreciated by those skilled in the art that various omissions, additions and modifications may be made to the embodiments described above without departing from the scope of the invention, and all such modifications and changes are intended to fall within the scope of the invention.

What is claimed is:

1. An ionic polymer composite device comprising:
    two extended electrode layers, each extended electrode layer comprising a first ionic polymer and a plurality of electrically conductive particles, wherein the plurality of electrically conductive particles forms a concentration gradient in each of the two extended electrode layers, the concentration gradient has an increasing concentration toward an outer surface of each of the two extended electrode layers; and
    a dielectric layer comprising a second ionic polymer between the two extended electrode layers, wherein the second ionic polymer is a second sulfonated poly ether sulfone polymer or a derivative thereof.

2. The ionic polymer composite device of claim 1, wherein the first ionic polymer is a first sulfonated poly ether sulfone polymer or a derivative thereof.

3. The ionic polymer composite device of claim 2, wherein the first sulfonated poly ether sulfone polymer and the second sulfonated poly ether sulfone polymer are independently selected from the group consisting of the following formulas:

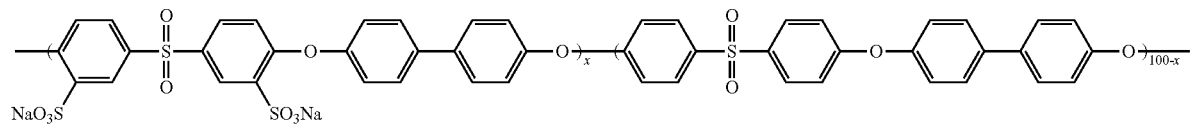

(Formula I)

wherein x is from about 30 to about 70;

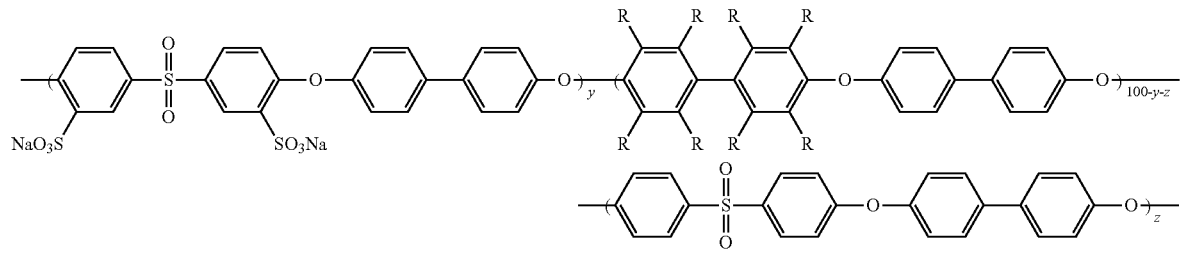

(Formula II)

wherein R is H or F, each of y and z is from about 30 to about 70; and

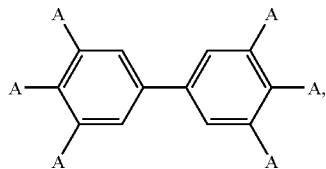
(Formula III)

wherein A is independently

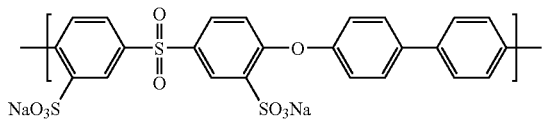

or OH, and at least one A is

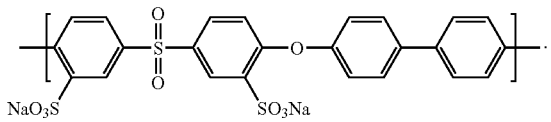

4. The ionic polymer composite device of claim 3, wherein the first ionic polymer has a lower IEC than an IEC of the second sulfonated poly ether sulfone polymer or the derivative thereof.

5. The ionic polymer composite device of claim 2, wherein the first sulfonated poly ether sulfone polymer or a derivative thereof has an IEC of at least about 1.4 meq/g.

6. The ionic polymer composite device of claim 2, wherein the first sulfonated poly ether sulfone polymer or a derivative thereof has an IEC of at least about 2 meq/g.

7. The ionic polymer composite device of claim 6, wherein the second sulfonated poly ether sulfone polymer or a derivative thereof has an IEC of at least about 1.4 meq/g.

8. The ionic polymer composite device of claim 1, wherein the second sulfonated poly ether sulfone polymer or the derivative thereof has an ion exchange capacity (IEC) of from about 0.9 meq/g to about 3.3 meq/g.

9. The ionic polymer composite device of claim 1, wherein at least one of the first and the second polymers has a weight-average molecular weight of more than about 100,000.

10. The ionic polymer composite device of claim 1, wherein the plurality of electrically conductive particles is selected from the group consisting of silver nanoparticles, other metal nanoparticles and carbon nanoparticles.

11. The ionic polymer composite device of claim 1, wherein the plurality of electrically conductive particles is carbon nanoparticles.

12. The ionic polymer composite device of claim 1 further comprising two surface electrodes, each surface electrode is disposed on an outer surface of each of the two extended electrode layers.

13. The ionic polymer composite device of claim 12, wherein each of the two surface electrodes comprises a conductive metal film covering at least a portion of the outer surface of each of the two extended electrode layers.

14. The ionic polymer composite device of claim 13, wherein the conductive metal film is a continuous film, a porous film, a mesh film or a plurality of wires.

15. The ionic polymer composite device of claim 13, wherein the conductive metal film is a sputter-coated gold film.

16. The ionic polymer composite device of claim 15, wherein the sputter-coated gold film is heat and pressure treated.

17. The ionic polymer composite device of claim 1 configured as a sensor or an actuator.

18. A method of making the ionic polymer composite device of claim 1 comprising:
providing at least one mixture comprising the plurality of electrically conductive particles dispersed in a first ionic polymer solution comprising a first sulfonated poly ether sulfone polymer or a derivative thereof;
forming the two extended electrode layers by curing the at least one mixture, wherein the plurality of electrically conductive particles are distributed within each of the two extended electrode layers; and
positioning the dielectric layer between the two extended electrode layers to form the ionic polymer composite device, wherein the dielectric layer comprises the second sulfonated poly ether sulfone polymer or a derivative thereof.

19. The method according to claim 18, wherein the at least one mixture is prepared using a high speed mixer.

20. The method according to claim 19, wherein the high speed mixer provides a force greater than about 10 G.

21. The method according to claim 18, wherein the plurality of electrically conductive particles in each of the two extended electrode layers forms a concentration gradient with a high concentration adjacent to a first surface of each of the two extended electrode layers, and the first surface of each of the two extended electrode layers becomes the outer surfaces of the ionic polymer composite.

22. The method according to claim 18, wherein the dielectric layer is prepared by:
providing a second sulfonated poly ether sulfone polymer solution; and
forming the dielectric layer by curing the second sulfonated poly ether sulfone polymer solution.

23. The method according to claim 18, wherein providing at least one mixture comprises providing a first mixture and a second mixture, the first mixture comprises a first concentration of electrically conductive particles dispersed in the first ionic polymer solution, and the second mixture comprises a second concentration of electrically conductive particles dispersed in the first ionic polymer solution.

24. The method according to claim 23, wherein forming the two extended electrode layers further comprises:
curing the first mixture to form a first ionic polymer film;
curing the second mixture to form a second ionic polymer film; and
combining the first ionic polymer film and the second ionic polymer film to form each of the two extended electrode layers.

25. The method according to claim 18, further comprising disposing a metal film on the outer surface of each of the two extended electrode layers.

26. The method according to claim 25, wherein the metal film is sputter-coated on the outer surface of each of the two extended electrode layers.

27. The method according to claim 26, further comprising applying heat and pressure to the metal film.

28. The method according to claim 18, wherein the first and the second sulfonated poly ether sulfone polymers or a derivative thereof are independently selected from the group consisting of the following formulas:

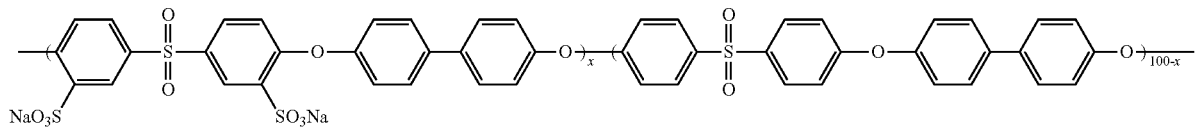
(Formula I)

wherein x is from about 30 to about 70;

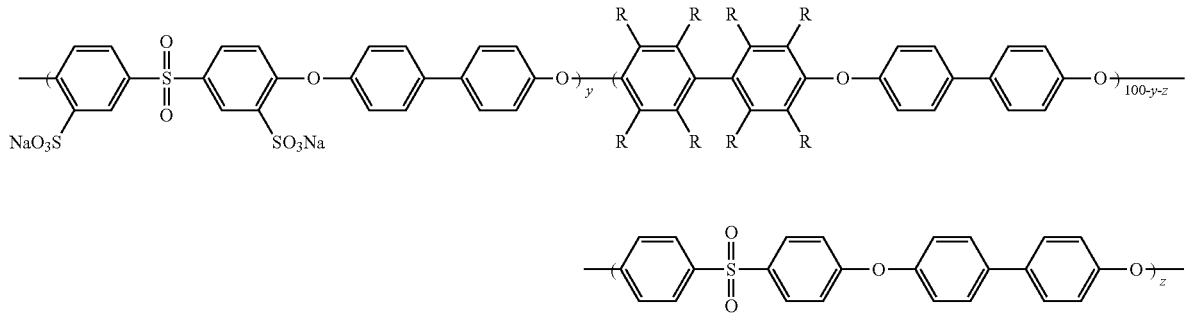
(Formula II)

wherein R is H or F, each of y and z is from about 30 to about 70; and

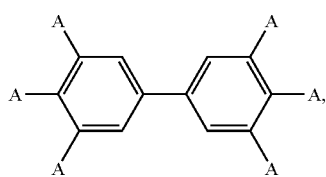
(Formula III)

wherein A is independently

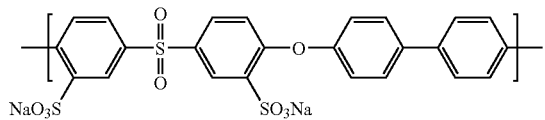

or OH, and at least one A is

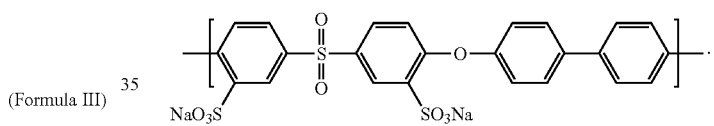

29. The method according to claim 18, wherein the at least one mixture further comprises a polymer for a matrix phase.

30. The method according to claim 29, wherein the polymer for the matrix phase is a non-ionic polymer.

31. The ionic polymer composite device of claim 1, wherein each of the two extended electrode layers further comprises a plurality of domains embedded in a matrix phase, wherein the plurality of domains comprises the first ionic polymer and the plurality of electrically conductive particles, and the matrix phase comprises a polymer having a substantially continuous three dimensional network structure.

32. The ionic polymer composite device of claim 31, wherein a swelling ratio of the first ionic polymer is higher than a swelling ratio of the second ionic polymer.

33. The ionic polymer composite device of claim 31, wherein the matrix phase comprises a non-ionic polymer.

34. The ionic polymer composite device of claim 31, wherein the first ionic polymer is selected from the group consisting of the following formulas:

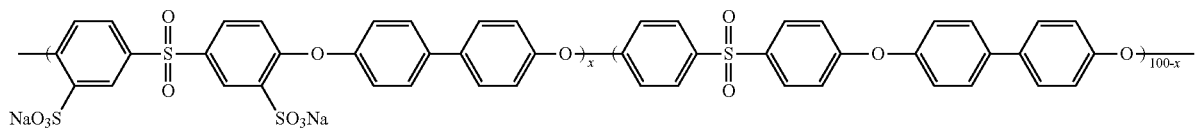
(Formula I)

wherein x is from about 30 to about 70;

(Formula II)
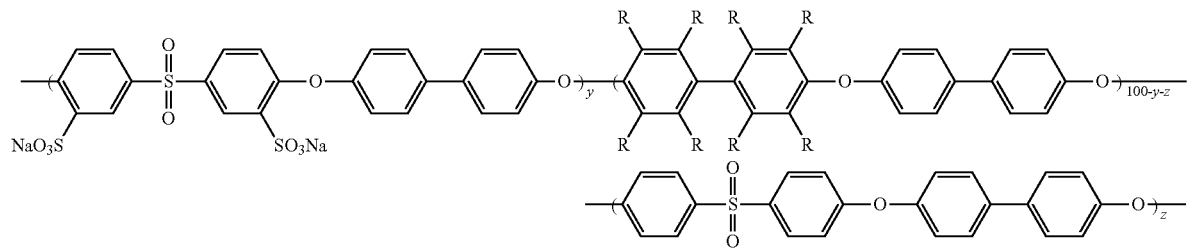
wherein R is H or F, each of y and z is from about 30 to about 70; and
(Formula III)
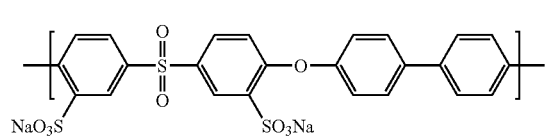
wherein A is independently
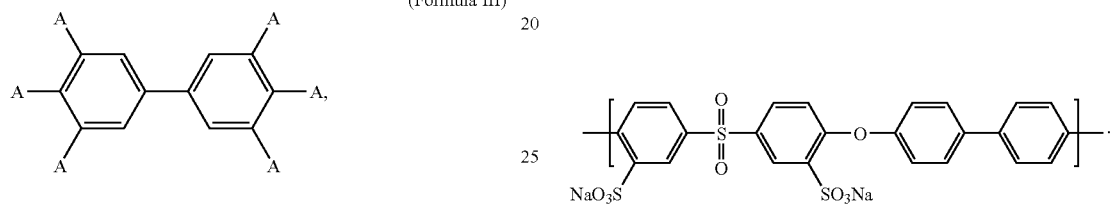
or OH, and at least one A is
35. The ionic polymer composite device of claim 31, wherein the second sulfonated poly ether sulfone polymer is selected from the group consisting of
(Formula I)
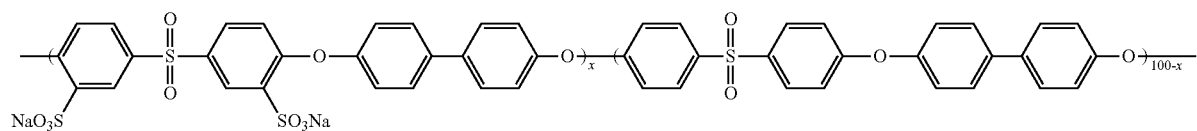
wherein x is from about 30 to about 70,
(Formula II)
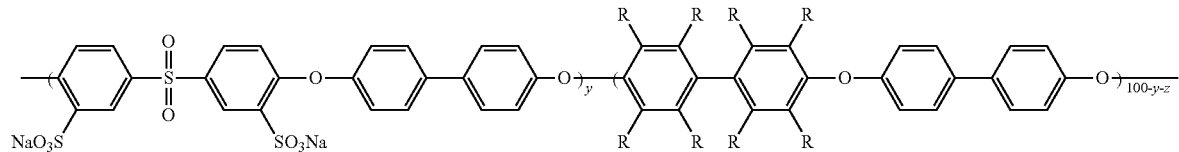
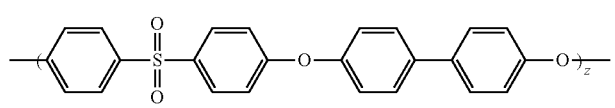

wherein R is H or F, each of y and z is from about 30 to about 70; and
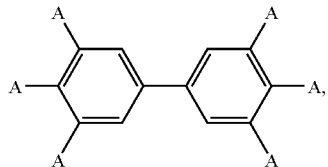
(Formula III)
wherein A is independently
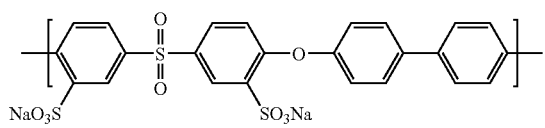
or OH, at least one A is
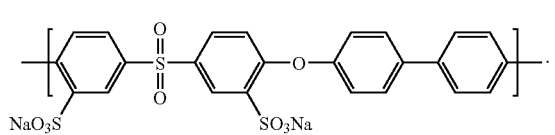
Formula I, Formula II and Formula III.
* * * * *